(12) United States Patent
Kozhemiak et al.

(10) Patent No.: US 10,567,321 B2
(45) Date of Patent: Feb. 18, 2020

(54) GENERATING INTERACTIVE MESSAGES WITH ASYNCHRONOUS MEDIA CONTENT

(71) Applicant: Snap Inc., Santa Monica, CA (US)

(72) Inventors: Grygoriy Kozhemiak, Odesa (UA); Oleksandr Pyshchenko, Los Angeles, CA (US); Victor Shaburov, Pacific Palisades, CA (US); Trevor Stephenson, Camarillo, CA (US); Aleksei Stoliar, Marina del Rey, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/237,296

(22) Filed: Dec. 31, 2018

(65) Prior Publication Data

US 2019/0207885 A1    Jul. 4, 2019

Related U.S. Application Data

(63) Continuation of application No. 15/860,397, filed on Jan. 2, 2018.

(60) Provisional application No. 62/643,449, filed on Mar. 15, 2018.

(51) Int. Cl.
| | |
|---|---|
| *G06F 15/16* | (2006.01) |
| *H04L 12/58* | (2006.01) |
| *H04L 29/08* | (2006.01) |

(52) U.S. Cl.
CPC ............ *H04L 51/10* (2013.01); *H04L 67/146* (2013.01)

(58) Field of Classification Search
CPC .............................. H04L 51/10; H04L 67/146
See application file for complete search history.

(56) References Cited

U.S. PATENT DOCUMENTS

| | | | |
|---|---|---|---|
| 8,595,757 B2 | 11/2013 | White et al. | |
| 8,887,189 B2 | 11/2014 | Beyabani | |
| 9,166,939 B2* | 10/2015 | Rasmussen | .... H04N 21/440263 |
| 9,185,348 B2 | 11/2015 | Choi et al. | |
| 9,300,835 B2* | 3/2016 | Jalkanen | ............ H04N 1/00159 |
| 9,314,692 B2 | 4/2016 | Konoplev et al. | |
| 9,553,841 B1* | 1/2017 | Skinner | .................. H04L 51/32 |

(Continued)

FOREIGN PATENT DOCUMENTS

| | | |
|---|---|---|
| EP | 2779633 | 9/2014 |
| WO | 2015189606 | 12/2015 |
| WO | 2019136089 | 7/2019 |

OTHER PUBLICATIONS

"International Application Serial No. PCT US2019 012081, International Search Report dated Apr. 15, 2019", 5 pgs.

(Continued)

*Primary Examiner* — Moustafa M Meky
(74) *Attorney, Agent, or Firm* — Schwegman Lundberg & Woessner, P.A.

(57) ABSTRACT

Systems and methods are provided for receiving a first media content item associated with a first interactive object of an interactive message, receiving a second media content item associated with a second interactive object of the interactive message, generating a third media content item based on the first media content item and second media content item, wherein the third media content item comprises combined features of the first media content item and the second media content item, and causing display of the generated third media content item.

20 Claims, 24 Drawing Sheets

(56) References Cited

U.S. PATENT DOCUMENTS

| | | | |
|---|---|---|---|
| 10,115,139 B2* | 10/2018 | High | G06Q 30/0613 |
| 10,205,697 B2* | 2/2019 | Skinner | H04L 12/1895 |
| 2009/0228938 A1 | 9/2009 | White et al. | |
| 2009/0237328 A1 | 9/2009 | Gyorfi et al. | |
| 2014/0067977 A1* | 3/2014 | Rasmussen | H04N 21/440263 709/206 |
| 2014/0129605 A1* | 5/2014 | Huang | G06Q 50/01 709/201 |
| 2016/0065529 A1* | 3/2016 | Katayama | G06F 3/0481 715/752 |
| 2016/0269350 A1 | 9/2016 | Rosen et al. | |
| 2016/0307351 A1* | 10/2016 | Zhang | G06T 11/60 |
| 2017/0085519 A1* | 3/2017 | Skinner | H04L 51/32 |
| 2017/0134456 A1 | 5/2017 | Mcdonnell et al. | |
| 2017/0220312 A1 | 8/2017 | Lee et al. | |
| 2017/0331689 A1* | 11/2017 | Gupta | H04L 67/306 |
| 2018/0077106 A1* | 3/2018 | Skinner | H04L 51/32 |
| 2019/0207884 A1 | 7/2019 | Kozhemiak et al. | |

OTHER PUBLICATIONS

"International Application Serial No. PCT US2019 012081, Written Opinion dated Apr. 15, 2019", 8 pgs.

"About Luxand BabyMaker—What Will Your Baby Look Like? Download Luxand BabyMaker on the AppStore! You Just Need Two Photos!", Luxand Face Recognition, [Online] Retrieved from the internet on Apr. 4, 2019: URL:https:web.archive.org web 20171017050945 https: www.luxand.com babymaker , (Oct. 17, 2017), 5 pgs.

"Luxand—FaceMorpher—Create Funny Face Animations. Morph them All!", Luxand Face Recognition, [Online] Retrieved from the internet on Apr. 4, 2019: URL:https: web.archive.org web 20170608072330 http: www.luxand.com facemorpher , (Jun. 8, 2017), 3 pgs.

"FaceSwapper—Create Perfect-Looking Collages and Win Photoshopping Contests!", Luxand Face Recognition, [Online] Retrieved from the internet on Apr. 4, 2019: URL:https:web.archive.org web 20170606072837 http: luxand.com faceswapper , (Jun. 6, 2017), 3 pgs.

U.S. Appl. No. 15/860,397, filed Jan. 2, 2018, Generating Interactive Messages With Asynchronous Media Content.

"U.S. Appl. No. 15/860,397, Notice of Allowance dated Aug. 26, 2019", 8 pgs.

"U.S. Appl. No. 15/860,397, Notice of Allowability dated Sep. 27, 2019", 2 pgs.

* cited by examiner

GENERATING INTERACTIVE MESSAGES WITH ASYNCHRONOUS MEDIA CONTENT

PRIORITY

This application is a continuation of and claims the benefit of priority of U.S. patent application Ser. No. 15/860,397, filed on Jan. 2, 2018; This application also claims the benefit of priority of U.S. Provisional Patent Application No. 62/643,449, filed Mar. 15, 2018, which are hereby incorporated by reference herein in their entirety.

BACKGROUND

A content sharing platform may receive millions of messages from users desiring to share media content such as audio, images, and video between user devices (e.g., mobile devices, personal computers, etc.). The media content of these messages may be associated with a common geolocation, a common time period, a common event, and so forth. Conventionally, a first user sends a message to a second user or to several users, and the second users or several users can view the message. The second user or several users may then create a new message and send the new message to the first user or other users.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
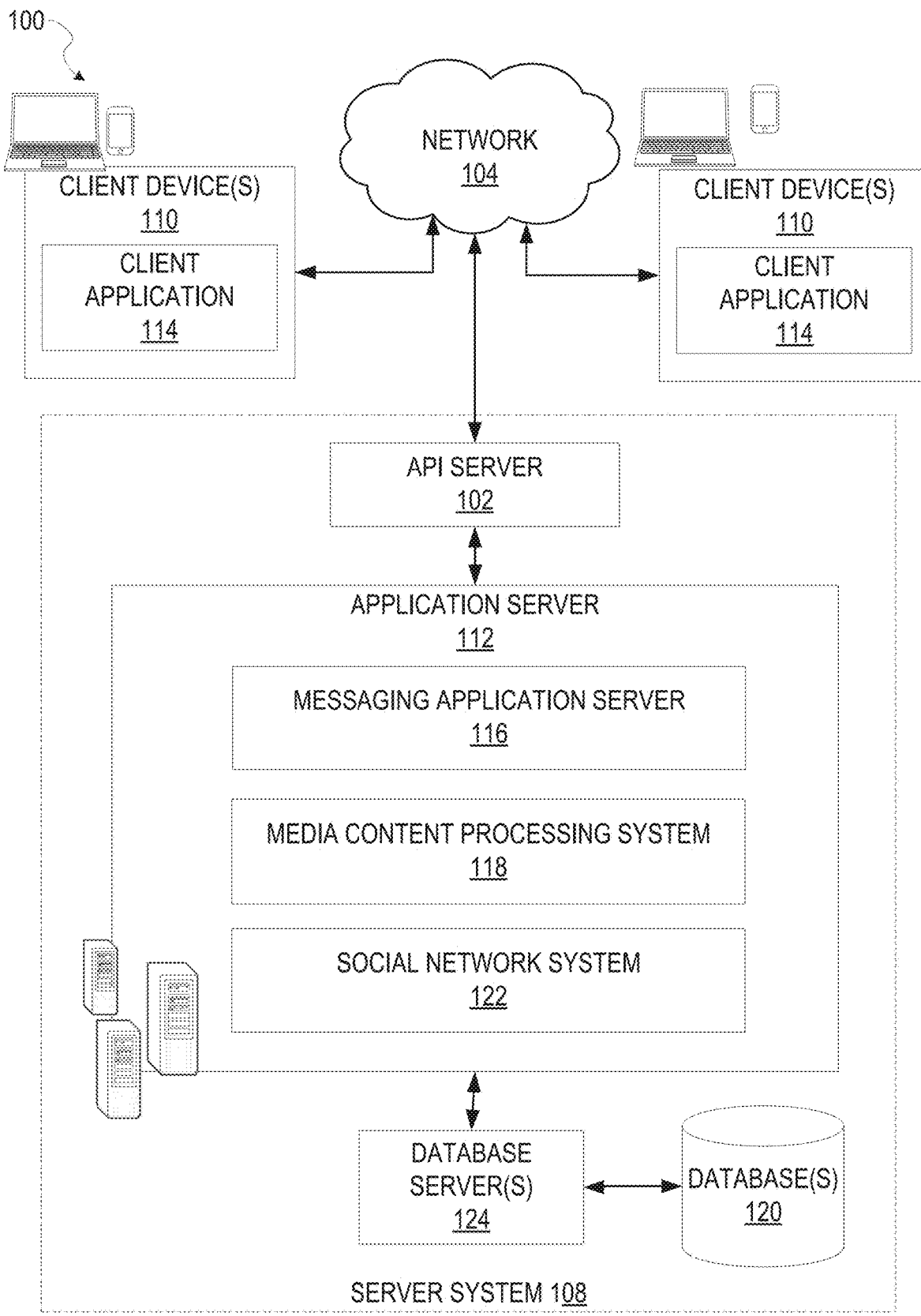
FIG. 1 is a block diagram showing an example messaging system for exchanging data (e.g., messages and associated content) over a network, according to some example embodiments.

Systems and methods described herein relate to generating interactive messages with asynchronous media content. As explained above, typically in a messaging system, a first user creates and sends a message to a second user. The second user receives the message from the first user and then creates and sends a new message back to the first user, or to other users. Example embodiments allow for interactive messaging that allow users to interact with each other via an interactive message. For example, a first user may create a message using personal media content, such as capturing a video of himself. The first user may send the message to a second user. The second user may view the message that has the first user's personal media content and then add her own personal media content, such as a video of herself. The second user may send the message with the first user's personal media content and the second user's personal media content to a third user, back to the second user, or to several users. The third user may view the message that has the first user's personal media content and the second user's personal media content and then add her own personal media content, such as a video of herself. The third user may then send the message to one or more other users. In this way, the message is passed from one user to the next and each user is able to contribute to the message. These asynchronous experiences can be captured in an interactive message.

An interactive message may be a predefined message (e.g., videos, images, etc.) with a plurality of objects associated with different areas or characters in the interactive message for which users may add personal content (e.g., band members, game players, locations in a scene, etc.). For example, an interactive message may be a video of a band playing that has an object for each band member. Users may be able to add an image or video of their face to the face for each band member.

One way to send an interactive message with personal media content from one or more users is to recompress the interactive message each time personal media content is added and then send the interactive message as one file to another user. For example, when the second user adds her personal content to the interactive message, the computing device would generate the interactive message by using the interactive message received from the first user and overlaying the personal content from the second user and then recording the entire message as one file. This method, however, may result in a very large file size which may not be suitable for sending and receiving by computing devices, such as mobile devices. Moreover, the inventors found that recompressing a video several times results in compression artifacts. For these reasons, example embodiments utilize the original personal content from each user to recreate the interactive message each time it is generated by a computing device receiving the interactive message. Moreover, example embodiments allow for a portion or subset of an image or video to be recorded (e.g., just a face of a user) for an object in an interactive message, to reduce file size for the images and video. Accordingly, example embodiments provide for a more efficient system by using smaller file sizes, and for higher quality messaging by using original personal content.

Figure 6:
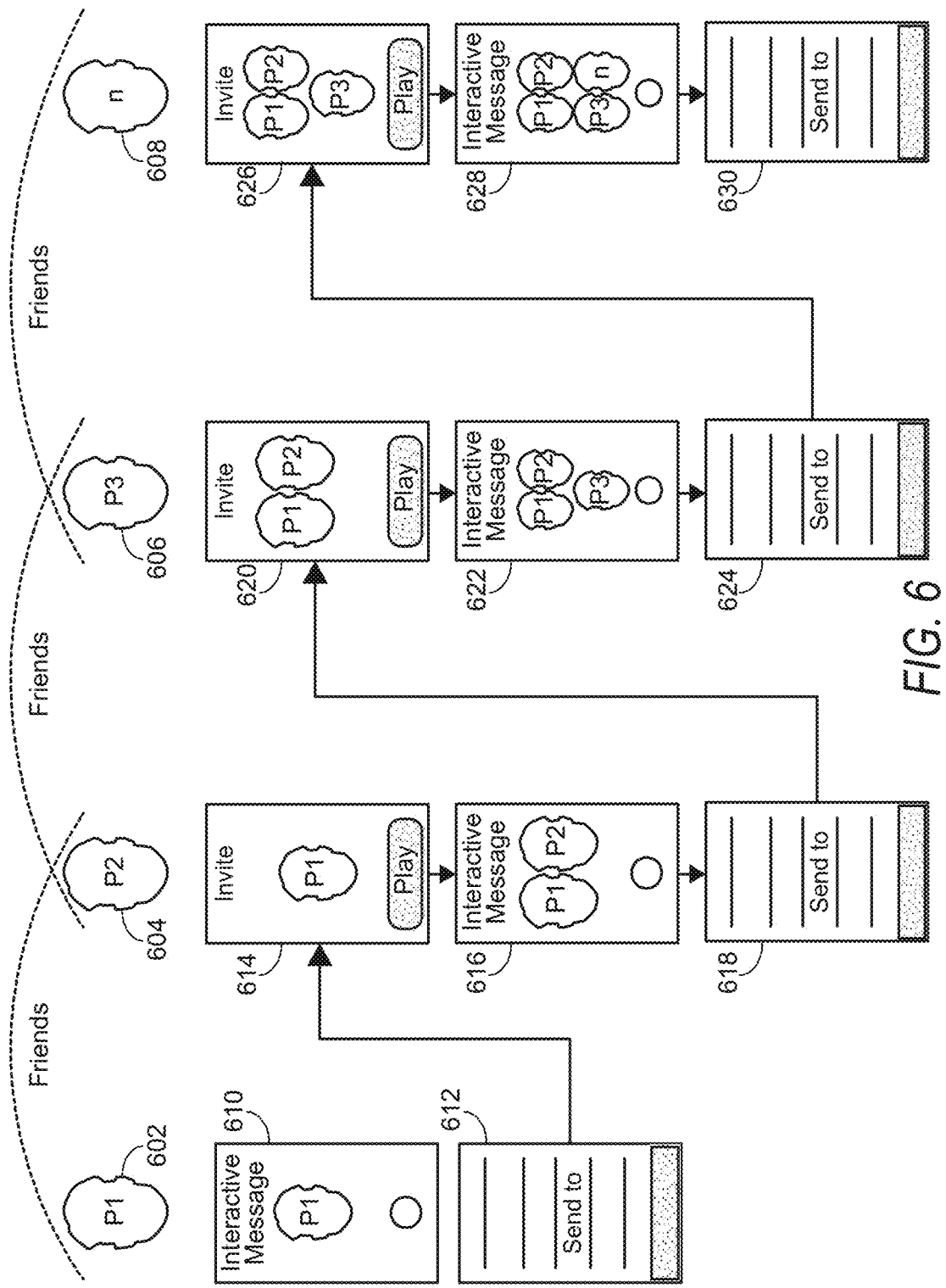
FIG. 6 is a diagram illustrating an example of sharing interactive messages, according to some example embodiments.

Before describing further detail, FIG. 6 is described to illustrate an example of sharing interactive messages, according to some example embodiments. For example, there may be a number of users, such as P1 (602), P2 (604), P3 (606), through n (608) users. A first user device 610 for user P1 generates an interactive message using input from user P1 (e.g., text, audio, video, image, etc.). User P1 may indicate 612 that he wishes to send the interactive message to at least user P2. The first user device 610 sends the interactive message to a second user device 614 associated with user P2. The second user device 614 renders and displays the interactive message. The second user device 614 generates content, using input from user P2 (e.g., text, audio, video, image, etc.), to add to the interactive message 616. User P2 may indicate 618 that she wishes to send the interactive message 616 to a third user device 620 associated with user P3. The third user device 620 renders and displays the interactive message 622. The third user device 620 generates content, using input from user P3 (e.g., text, audio, video, image, etc.), to add to the interactive message 622. User P3 may indicate 624 that she wishes to send the interactive message 622 to a fourth user device 626 associated with user n. The fourth user device 626 renders and displays the interactive message 628. The fourth user device 626 generates content, using input from user n (e.g., text, audio, video, image, etc.), to add to the interactive message 628. User n may indicate 630 that she wishes to send the interactive message 628 to a fifth user device, and so this process may continue. Note that this diagram illustrates sending interactive messages in a chain (e.g., from one user to the next user). In other example embodiments, a user may send an interactive message to more than one user and then each of those users may send the message to one or more users.

FIG. 1 is a block diagram illustrating a networked system 100 (e.g., a messaging system) for exchanging data (e.g., messages and associated content) over a network. The networked system 100 includes multiple client devices 110, each of which hosts a number of client applications 114. Each client application 114 is communicatively coupled to other instances of the client application 114 and a server system 108 via a network 104.

The client device 110 may comprise, but is not limited to, a mobile phone, desktop computer, laptop, portable digital assistant (PDA), smart phone, tablet, ultrabook, netbook, laptop, multi-processor system, microprocessor-based or programmable consumer electronic system, game console, set-top box, computer in a vehicle, wearable device, or any other communication device that a user may utilize to access the networked system 100. In some embodiments, the client device 110 may comprise a display module (not shown) to display information (e.g., in the form of user interfaces). In further embodiments, the client device 110 may comprise one or more of touch screens, accelerometers, gyroscopes, cameras, microphones, global positioning system (GPS) devices, and so forth.

The client device 110 may be a device of a user that is used to create media content items such as video, images (e.g., photographs), and audio, and to send and receive messages containing such media content items, text, and so forth, to and from other users. The client device 110 may be a device of a user that is used to create and edit media overlays.

One or more users may be a person, a machine, or other means of interacting with the client device 110. In example embodiments, the user may not be part of the system 100, but may interact with the system 100 via the client device 110 or other means. For instance, the user may provide input (e.g., touch screen input or alphanumeric input) to the client device 110, and the input may be communicated to other entities in the system 100 (e.g., third party servers, server system 108, etc.) via a network 104. In this instance, the other entities in the system 100, in response to receiving the input from the user, may communicate information to the client device 110 via the network 104 to be presented to the user. In this way, the user may interact with the various entities in the system 100 using the client device 110.

The system 100 may further include a network 104. One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WI-FI network, a WiMax network, another type of network, or a combination of two or more such networks.

The client device 110 may access the various data and applications provided by other entities in the system 100 via a web client (e.g., a browser, such as the Internet Explorer® browser developed by Microsoft® Corporation of Redmond, Wash. State) or one or more client applications 114. The client device 110 may include one or more client applications 114 (also referred to as "apps") such as, but not limited to, a web browser, a messaging application, an electronic mail (email) application, an e-commerce site application, a mapping or location application, a media overlay application, an interactive messaging application, and the like.

In some embodiments, one or more client applications 114 may be included in a given one of the client devices 110, and configured to locally provide the user interface and at least some of the functionalities, with the client application 114 configured to communicate with other entities in the system 100 (e.g., third party servers, server system 108, etc.), on an as-needed basis, for data and/or processing capabilities not locally available (e.g., to process user queries, to authenticate a user, to verify a method of payment, etc.). Conversely, one or more client applications 114 may not be included in the client device 110, and then the client device 110 may use its web browser to access the one or more applications hosted on other entities in the system 100 (e.g., third party servers, server system 108, etc.).

In one example, a client application 114 may be a messaging application that allows a user to take a photograph or video, add a caption or otherwise edit the photograph or video, and then send the photograph or video to another user. In one example, the message may be ephemeral and be removed from a receiving user device after viewing or after a predetermined amount of time (e.g., 10 seconds, 24 hours, etc.). An ephemeral message refers to a message that is accessible for a time-limited duration. An ephemeral message may be a text, an image, a video, and other such content that may be stitched together in accordance with embodiments described herein. The access time for the ephemeral message may be set by the message sender. Alternatively, the access time may be a default setting or a setting specified by the recipient. Regardless of the setting technique, the message is transitory.

The messaging application may further allow a user to create a gallery or message collection. A gallery may be a collection of photos and videos which may be viewed by other users "following" the user's gallery (e.g., subscribed to view and receive updates in the user's gallery). In one example, the gallery may also be ephemeral (e.g., lasting 24 hours, lasting for a duration of an event (e.g., during a music concert, sporting event, etc.), or lasting another predetermined time).

An ephemeral message may be associated with a message duration parameter, the value of which determines an amount of time that the ephemeral message will be displayed to a receiving user of the ephemeral message by the client application 114. The ephemeral message may be further associated with a message receiver identifier and a message timer. The message timer may be responsible for determining the amount of time the ephemeral message is shown to a particular receiving user identified by the message receiver identifier. For example, the ephemeral message may only be shown to the relevant receiving user for a time period determined by the value of the message duration parameter.

In another example, the messaging application may allow a user to store photographs and videos and create a gallery that is not ephemeral and that can be sent to other users. For example, a user may assemble photographs and videos from a recent vacation to share with friends and family.

The server system 108 may provide server-side functionality via the network 104 (e.g., the Internet or a wide area network (WAN)) to one or more client devices 110 and/or one or more third party servers (not shown). The server system 108 may include an application programming interface (API) server 102, an application server 112, a messaging application server 116, a media content processing system 118, and a social network system 122, which may each be communicatively coupled with each other and with one or more data storage(s), such as database(s) 120.

The server system 108 may be a cloud computing environment, according to some example embodiments. The server system 108, and any servers associated with the server system 108, may be associated with a cloud-based application, in one example embodiment.

The one or more database(s) 120 may be storage devices that store information such as untreated media content, original media content from users (e.g., high-quality media content), processed media content (e.g., media content that is formatted for sharing with client devices 110 and viewing on client devices 110), context data related to a media content item, context data related to a user device (e.g., computing or client device 110), media overlays, media overlay smart widgets or smart elements, user data, user device information, media content (e.g., video and images), media content data (e.g., data associated with video and images), computing device context data, serialized data, session data items, and so forth. The one or more databases 120 may further store information related to third party servers, third party applications, client devices 110, client applications 114, users, and so forth.

The one or more database(s) 120 may include cloud-based storage external to the server system 108 (e.g., hosted by one or more third-party entities external to the server system 108). While the storage devices are shown as database(s) 120, it is to be understood that the system 100 may access and store data in storage devices such as databases 120, blob storages, and other types of storage methods.

The system 100 may further include one or more third party servers (not shown). The one or more third party servers may include one or more third party application(s). The one or more third party application(s), executing on the third party server(s), may interact with the server system 108 via API server 102 via a programmatic interface provided by the API server 102. For example, one or more of the third party applications may request and utilize information from the server system 108 via the API server 102 to support one or more features or functions on a website hosted by the third party or an application hosted by the third party. The third party website or application, for example, may provide functionality that is supported by relevant functionality and data in the server system 108.

Accordingly, each client application 114 is able to communicate and exchange data with other client applications 114 and with the server system 108 via the network 104. The data exchanged between client applications 114, and between a client application 114 and the server system 108, includes functions (e.g., commands to invoke functions) as well as payload data (e.g., text, audio, video, or other multimedia data).

The server system 108 provides server-side functionality via the network 104 to a particular client application 114. While certain functions of the system 100 are described herein as being performed by either a client application 114 or by the server system 108, it will be appreciated that the location of certain functionality either within the client application 114 or within the server system 108 is a design choice. For example, it may be technically preferable to initially deploy certain technology and functionality within the server system 108, but to later migrate this technology and functionality to the client application 114 where a client device 110 has a sufficient processing capacity.

The server system 108 supports various services and operations that are provided to the client application 114. Such operations include transmitting data to, receiving data from, and processing data generated by the client application 114. This data may include message content, client device information, geolocation information, media annotation and overlays, message content persistence conditions, social network information, live event information, date and time stamps, media content (e.g., video and images), and media content data (e.g., data associated with video and images), as examples. Data exchanges within the networked system 100 are invoked and controlled through functions available via user interfaces (UIs) of the client application 114.

In the server system 108, the API server 110 is coupled to, and provides a programmatic interface to, the application server 112. The application server 112 is communicatively coupled to a database server 124, which facilitates access to the one or more database(s) 120 in which is stored data associated with messages processed by the application server 112.

The API server 102 receives and transmits message data (e.g., commands and message payloads) between the client device 110 and the application server 112. Specifically, the API server 102 provides a set of interfaces (e.g., routines and protocols) that can be called or queried by the client application 114 in order to invoke functionality of the application server 112. The API server 102 exposes various functions supported by the application server 112, including account registration; login functionality; the sending of messages, via the application server 112, from a particular client application 114 to another client application 114; the sending of media files (e.g., images or video) from a client application 114 to the messaging application server 116, for possible access by another client application 114; the setting of a collection of media data (e.g., a gallery, story, message collection, or media collection); the retrieval of a list of friends of a user of a client device 110; the retrieval of such collections; the retrieval of messages and content; the adding of friends to and deletion of friends from a social graph; the location of friends within a social graph; opening an application event (e.g., relating to the client application 114); and so forth.

The application server 112 hosts a number of applications and subsystems, including the messaging application server 116, the media content processing system 118, and the social network system 122. The messaging application server 116 implements a number of message processing technologies and functions, particularly related to the aggregation and other processing of content (e.g., textual and multimedia content) included in messages received from multiple instances of the client application 114. The text and media content from multiple sources may be aggregated into collections of content (e.g., called stories, galleries, or media collections). These collections are then made available, by the messaging application server 116, to the client application 114. Other processor- and memory-intensive processing of data may also be performed server-side by the messaging application server 116, in view of the hardware requirements for such processing.

The application server 112 also includes the media content processing system 118, which is dedicated to performing various media content processing operations, typically with respect to images or video received within the payload of a message at the messaging application server 116. The media content processing system 118 may access one or more data storages (e.g., database(s) 120) to retrieve stored data to use in processing media content and to store results of processed media content.

The social network system 122 supports various social networking functions and services, and makes these functions and services available to the messaging application server 116. To this end, the social network system 122 maintains and accesses an entity graph 304 (depicted in FIG. 3) within the database 120. Examples of functions and services supported by the social network system 122 include the identification of other users of the networked system 100 with whom a particular user has relationships or whom the particular user is "following," and also the identification of other entities and interests of a particular user.

The messaging application server 116 may be responsible for generation and delivery of messages between users of client devices 110. The messaging application server 116 may utilize any one of a number of message delivery networks and platforms to deliver messages to users. For example, the messaging application server 116 may deliver messages using electronic mail (email), instant message (IM), Short Message Service (SMS), text, facsimile, or voice (e.g., Voice over IP (VoIP)) messages via wired networks (e.g., the Internet), plain old telephone service (POTS), or wireless networks (e.g., mobile, cellular, WIFI, Long Term Evolution (LTE), or Bluetooth).

Figure 2:
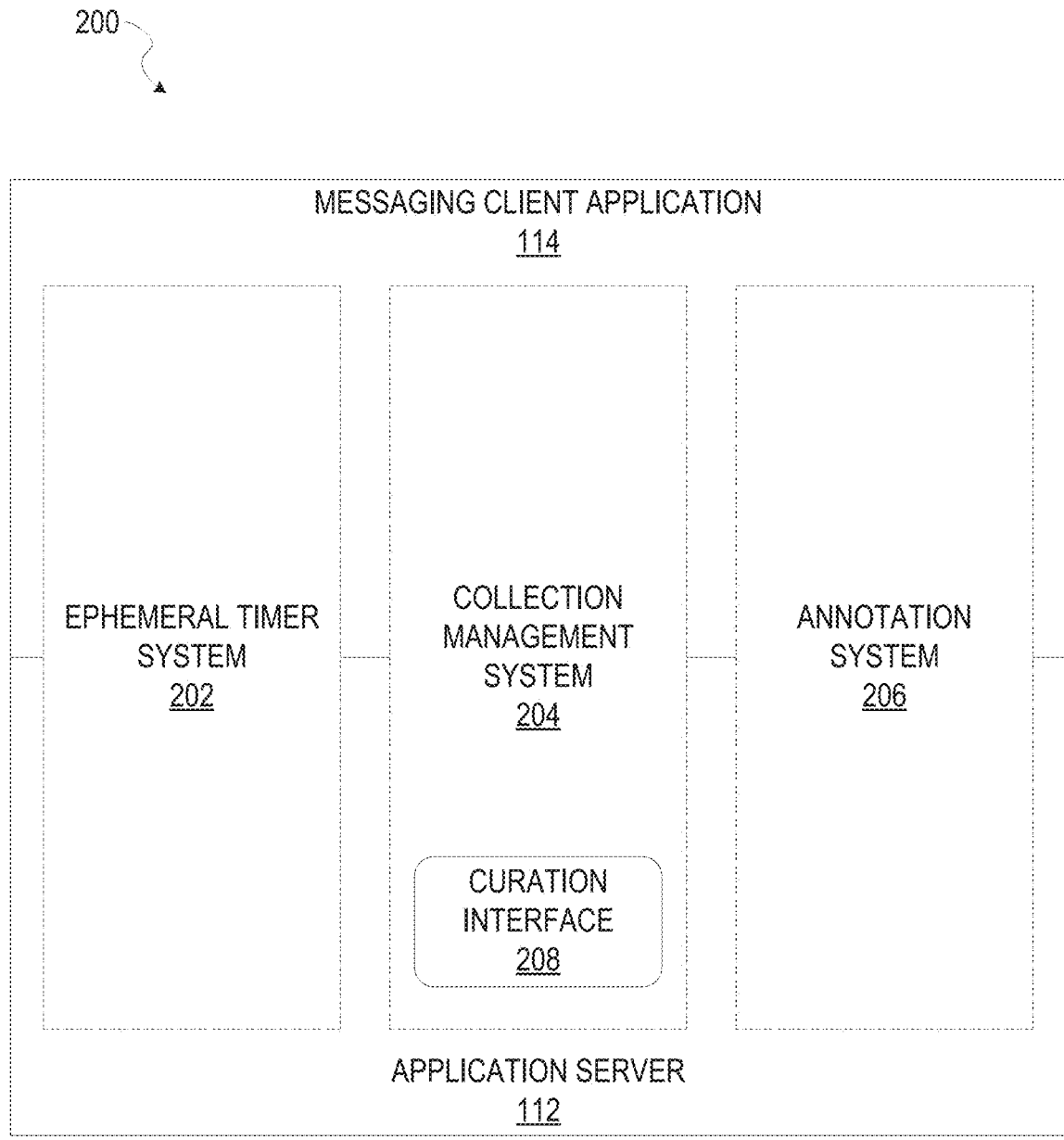
FIG. 2 is a block diagram illustrating further details regarding the messaging system, according to some example embodiments.

FIG. 2 is a block diagram 200 illustrating further details regarding the system 100, according to example embodiments. Specifically, the system 200 is shown to comprise the messaging client application 114 and the application server 112, which in turn embody a number of subsystems, namely an ephemeral timer system 202, a collection management system 204, and an annotation system 206.

The ephemeral timer system 202 is responsible for enforcing the temporary access to content permitted by the messaging client application 114 and the messaging application server 116. To this end, the ephemeral timer system 202 incorporates a number of timers that, based on duration and display parameters associated with a message, or collection of messages (e.g., otherwise referred to herein as media collections, galleries, message collections, stories, and the like), selectively display and enable access to messages and associated content via the messaging client application 114.

The collection management system 204 is responsible for managing collections of media (e.g., collections of text, image, video, and audio data). In some examples, a collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "Story" for the duration of that music concert. The collection management system 204 may also be responsible for publishing an icon that provides notification of the existence of a particular collection to the user interface of the messaging client application 114.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation (e.g., money, non-money credits or points associated with the messaging system or a third party reward system, travel miles, access to artwork or specialized lenses, etc.) may be paid to a user for inclusion of user-generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the networked system 100. In one example, the annotation system 206 operatively supplies a media overlay (e.g., a filter or media augmentation) to the messaging client application 114 based on a geolocation of the client device 110. In another example, the annotation system 206 operatively supplies a media overlay to the messaging client application 114 based on other information, such as social network information of the user of the client device 110. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 110. For example, the media overlay includes text that can be overlaid on top of a photograph taken by the client device 110. In another example, the media overlay includes an identification of a location overlay (e.g., Venice Beach), a name of a live event, or a name of a merchant overlay (e.g., Beach Coffee House). In another example, the annotation system 206 uses the geolocation of the client device 110 to identify a media overlay that includes the name of a merchant at the geolocation of the client device 110. The media overlay may include other indicia associated with the merchant. The media overlays may be stored in the database 120 and accessed through the database server 124.

The annotation system 206 may further enable a user to interact with an interactive message, such as by adding one or more media content items to the interactive message, as described in further detail below. In one example embodiment, the annotation system 206 provides a publication platform that allows a user or merchant to create an interactive message with a plurality of objects associated with the interactive message for which users may add personal content. For example, a designer may create a video of a rock band with various interactive objects for different members of the band (a drummer, a keyboard player, a guitarist, etc.). The video of the rock band may be made available to users as an interactive message.

In one example embodiment, the annotation system 206 provides a user-based publication platform that enables users to select a geolocation on a map, and upload content associated with the selected geolocation. The user may also specify circumstances under which a particular media overlay is to be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time.

Figure 3:
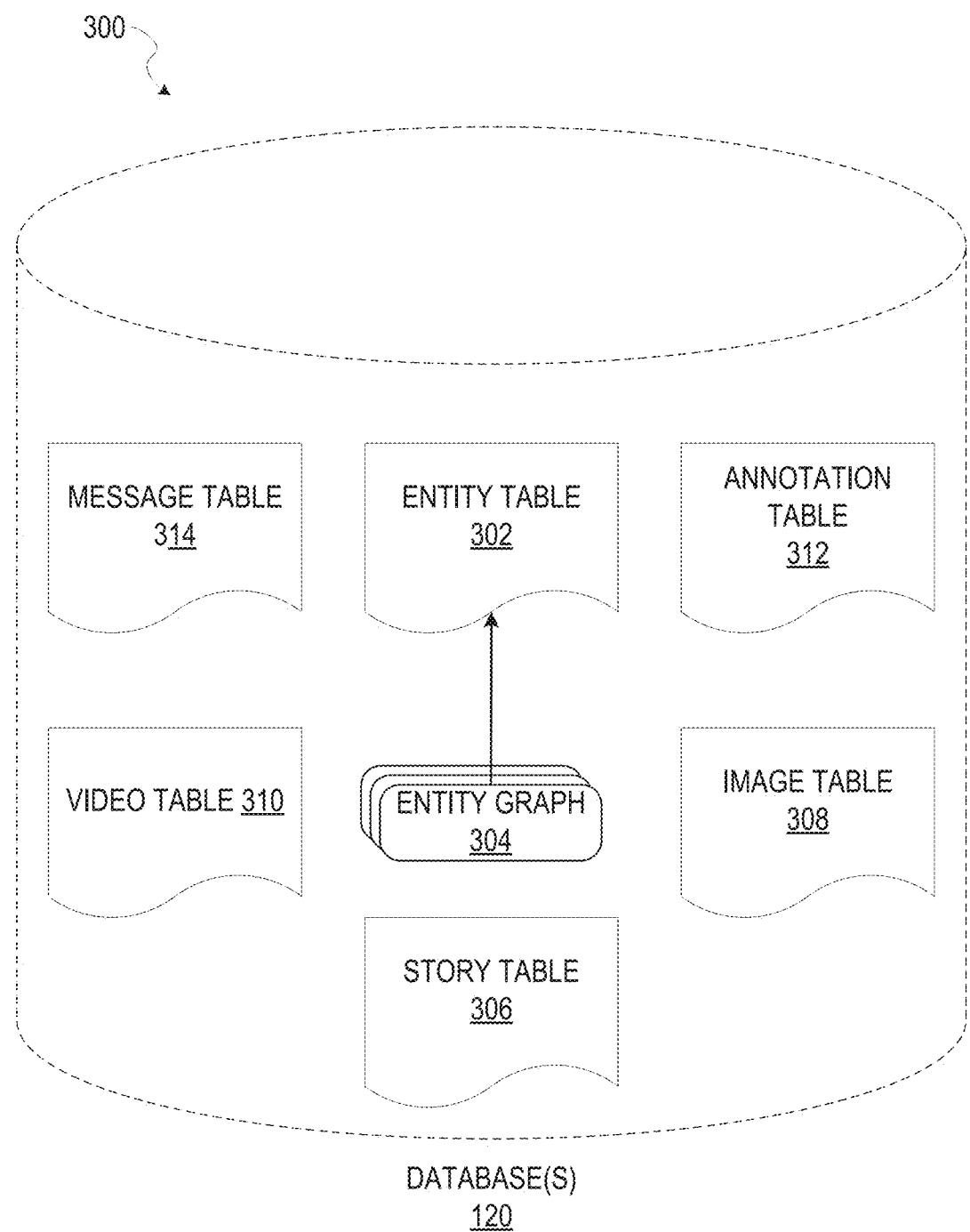
FIG. 3 is a schematic diagram illustrating data which may be stored in a database of a messaging server system, according to some example embodiments.

FIG. 3 is a schematic diagram 300 illustrating data which may be stored in the database(s) 120 of the server system 108, according to certain example embodiments. While the content of the database 120 is shown to comprise a number of tables, it will be appreciated that the data could be stored in other types of data structures (e.g., as an object-oriented database).

The database 120 includes message data stored within a message table 314. An entity table 302 stores entity data, including an entity graph 304. Entities for which records are maintained within the entity table 302 may include individuals, corporate entities, organizations, objects, places, events, etc. Regardless of type, any entity regarding which the server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization), interested-based, or activity-based, merely for example.

The database 120 also stores annotation data, in the example form of media overlays or filters, in an annotation table 312. Annotation data may also be referred to herein as "creative tools" or "interactive features." Annotation data may comprise predefined interactive messages to be provided to users.

Media overlays or filters, for which data is stored within the annotation table 312, are associated with and applied to videos (for which data is stored in a video table 310) and/or images (for which data is stored in an image table 308). Filters, in one example, are overlays that are displayed as overlaid on an image or video during presentation to a recipient user. Filters may be of various types, including user-selected filters from a gallery of filters presented to a sending user by the messaging client application 114 when the sending user is composing a message. Other types of filters include geolocation filters (also known as geo-filters), which may be presented to a sending user based on geographic location. For example, geolocation filters specific to a neighborhood or special location may be presented within a user interface by the messaging client application 114, based on geolocation information determined by a GPS unit of the client device 110. Another type of filter is a data filter, which may be selectively presented to a sending user by the messaging client application 114, based on other inputs or information gathered by the client device 110 during the message creation process. Examples of data filters include a current temperature at a specific location, a current speed at which a sending user is traveling, a battery life for a client device 110, or the current time.

Other annotation data that may be stored within the annotation table 312 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the message table 314. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a story, gallery, or media collection). The creation of a particular collection may be initiated by a particular user (e.g., any user for whom a record is maintained in the entity table 302). A user may create a "personal story" in the form of a collection of content that has been created and sent/broadcast by that user. To this end, the user interface of the messaging client application 114 may include an icon that is user-selectable to enable a sending user to add specific content to his or her personal story.

A media or message collection may also constitute a "live story," which is a collection of content from multiple users that is created manually, automatically, or using a combination of manual and automatic techniques. For example, a "live story" may constitute a curated stream of user-submitted content from various locations and events. Users whose client devices 110 have location services enabled and are at a common event location at a particular time may, for example, be presented with an option, via a user interface of the messaging client application 114, to contribute content to a particular live story. The live story may be identified to the user by the messaging client application 114, based on his or her location. The end result is a "live story" told from a community perspective.

A further type of content collection is known as a "location story," which enables a user whose client device 110 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
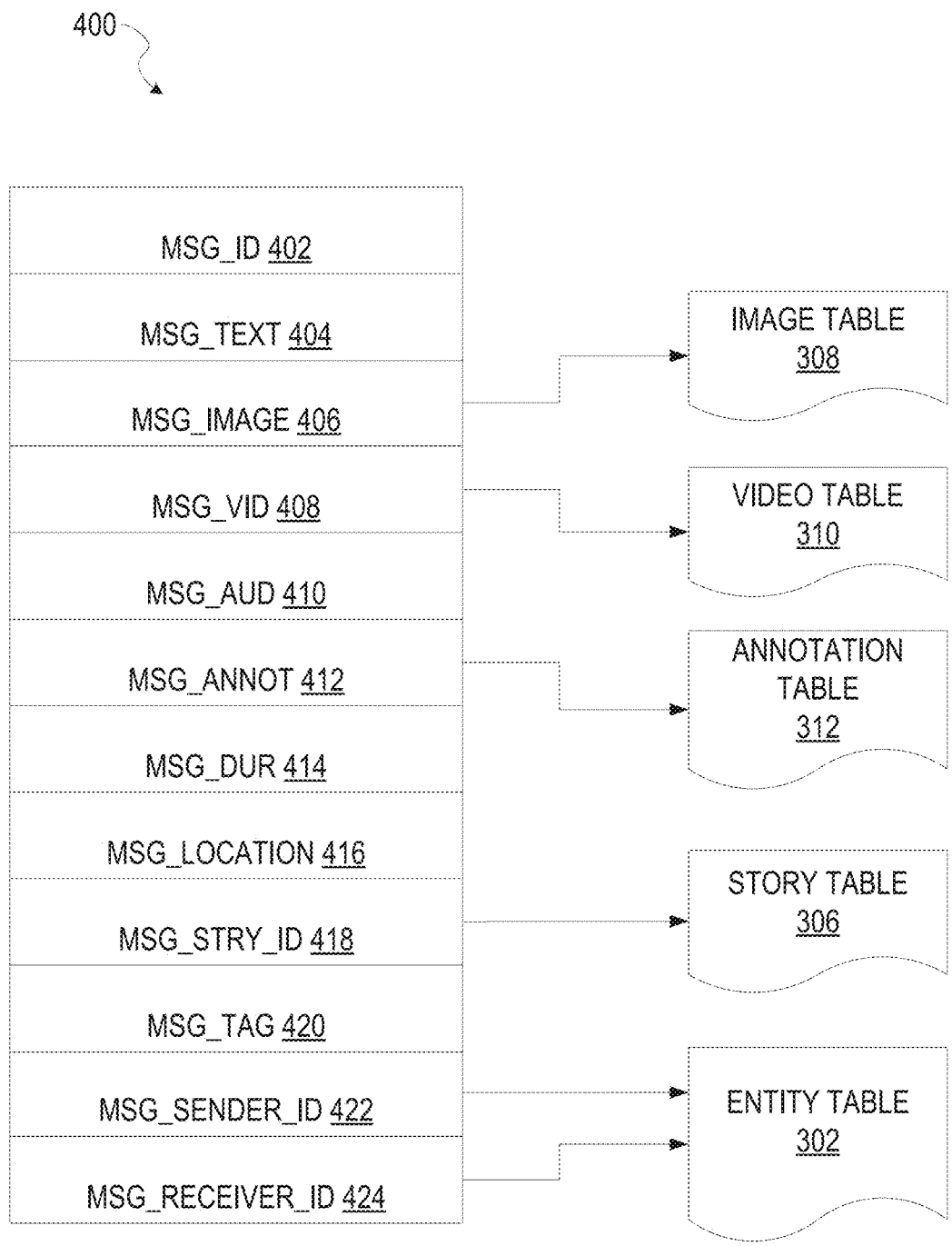
FIG. 4 is a schematic diagram illustrating a structure of a message, according to some embodiments, generated by a messaging client application for communication.

FIG. 4 is a schematic diagram illustrating a structure of a message 400, according to some embodiments, generated by a client application 114 for communication to a further client application 114 or the messaging application server 116. The content of a particular message 400 is used to populate the message table 314 stored within the database 120, accessible by the messaging application server 116. Similarly, the content of a message 400 is stored in memory as "in-transit" or "in-flight" data of the client device 110 or the application server 112. The message 400 is shown to include the following components:

A message identifier 402: a unique identifier that identifies the message 400.

A message text payload 404: text, to be generated by a user via a user interface of the client device 110 and that is included in the message 400.

A message image payload 406: image data, captured by a camera component of a client device 110 or retrieved from memory of a client device 110, and that is included in the message 400.

A message video payload 408: video data, captured by a camera component or retrieved from a memory component of the client device 110 and that is included in the message 400.

A message audio payload 410: audio data, captured by a microphone or retrieved from the memory component of the client device 110, and that is included in the message 400.

A message annotations 412: annotation data (e.g., media overlays such as filters, stickers, or other enhancements) that represents annotations to be applied to the message image payload 406, message video payload 408, or message audio payload 410 of the message 400.

A message duration parameter 414: a parameter value indicating, in seconds, the amount of time for which content of the message 400 (e.g., the message image payload 406, message video payload 408, message audio payload 410) is to be presented or made accessible to a user via the messaging client application 114.

A message geolocation parameter 416: geolocation data (e.g., latitudinal and longitudinal coordinates) associated with the content payload of the message 400. Multiple message geolocation parameter 416 values may be included in the payload, each of these parameter values being associated with respect to content items included in the content (e.g., a specific image within the message image payload 406, or a specific video in the message video payload 408).

A message story identifier 418: identifier values identifying one or more content collections (e.g., "stories") with which a particular content item in the message image payload 406 of the message 400 is associated. For example, multiple images within the message image payload 406 may each be associated with multiple content collections using identifier values.

A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address, or device identifier) indicative of a user of the client device 110 on which the message 400 was generated and from which the message 400 was sent.

A message receiver identifier 424: an identifier (e.g., a messaging system identifier, email address, or device identifier) indicative of a user of the client device 110 to which the message 400 is addressed.

The contents (e.g., values) of the various components of the message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored within the message annotations 412 may point to data stored in an annotation table 312, values stored within the message story identifier 418 may point to data stored in a story table 306, and values stored within the message sender identifier 422 and the message receiver identifier 424 may point to user records stored within an entity table 302.

Figure 5:
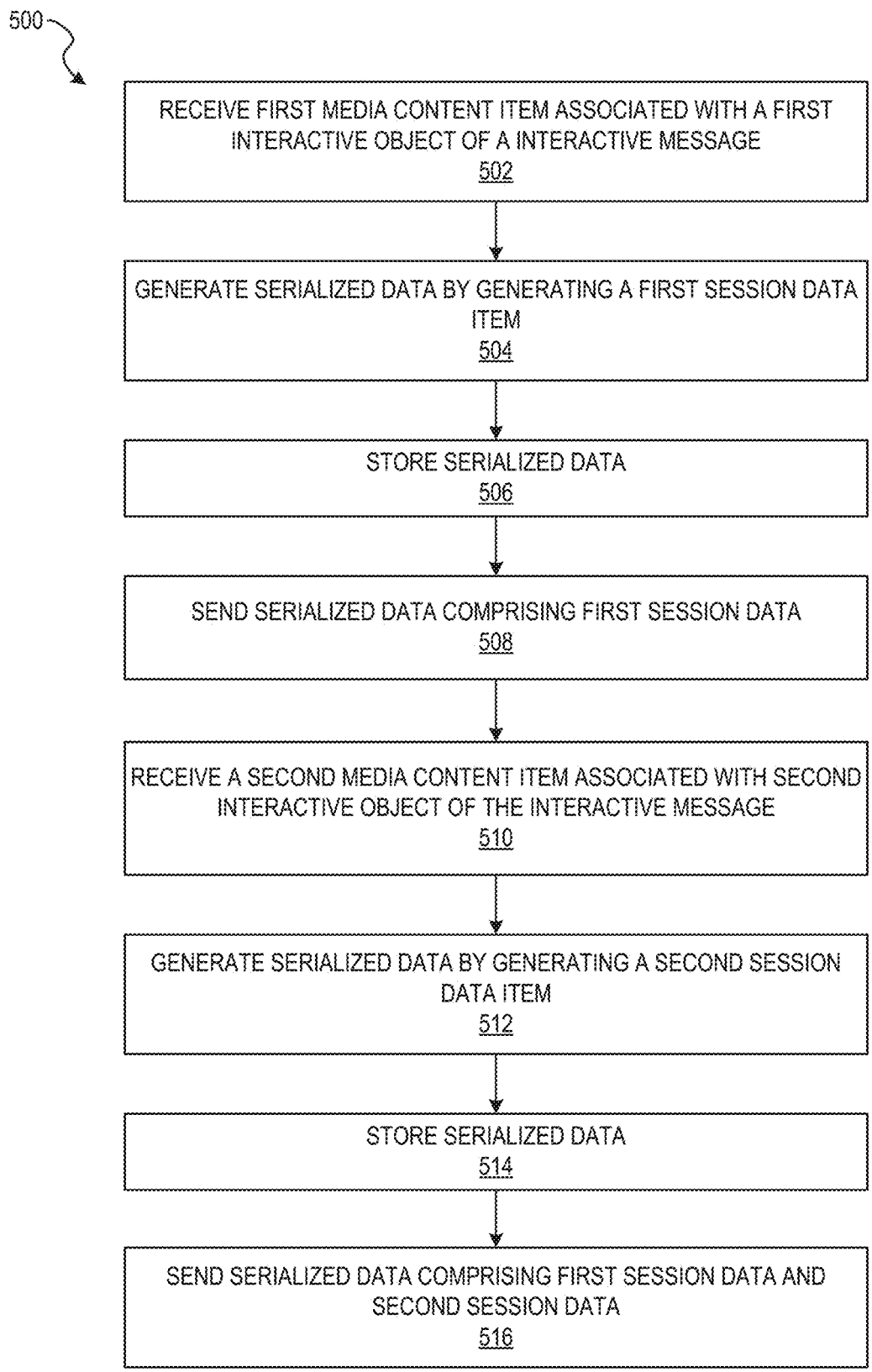
FIG. 5 is a flow chart illustrating aspects of a method, according to some example embodiments.

FIG. 5 is a flow chart illustrating aspects of a method 500, according to some example embodiments. For illustrative purposes, the method 500 is described with respect to the networked system 100 of FIG. 1. It is to be understood that the method 500 may be practiced with other system configurations in other embodiments.

In operation 502, a server computer (e.g., via server system 108) receives a first media content item associated with a first interactive object of an interactive message. The interactive message may comprise a plurality of interactive objects. The server computer may receive the first media content item from a first computing device (e.g., client device 110). The server computer may receive the first media content item associated with the first interactive object of the interactive message in a request to send the interactive message to one or more other computing devices.

In one example, the first computing device may send a request for the interactive message to the server computer. For example, a first user may be using the first computing device to generate a message to send to one or more users (e.g., via a messaging application running on the first computing device). The user may indicate that he wishes to generate an interactive message (e.g., via selecting a menu item, interacting with a touch screen of a display of the first computing device, interacting with a button on the first computing device, and the like). The interactive message may be available locally on the first computing device (e.g., stored in memory of the first computing device) or may be requested from the server computer. If the interactive message is requested from the server computer, the server computer receives the request for the interactive message and sends the interactive message to the first client device.

The first computing device may display the interactive message on a display of the first computing device. The first user may capture a media content item (e.g., an image or video), input text or audio, or otherwise interact with the interactive message to add media content to the interactive message. For example, the user may use a camera device of the first computing device to capture a video or image.

Figure 7:
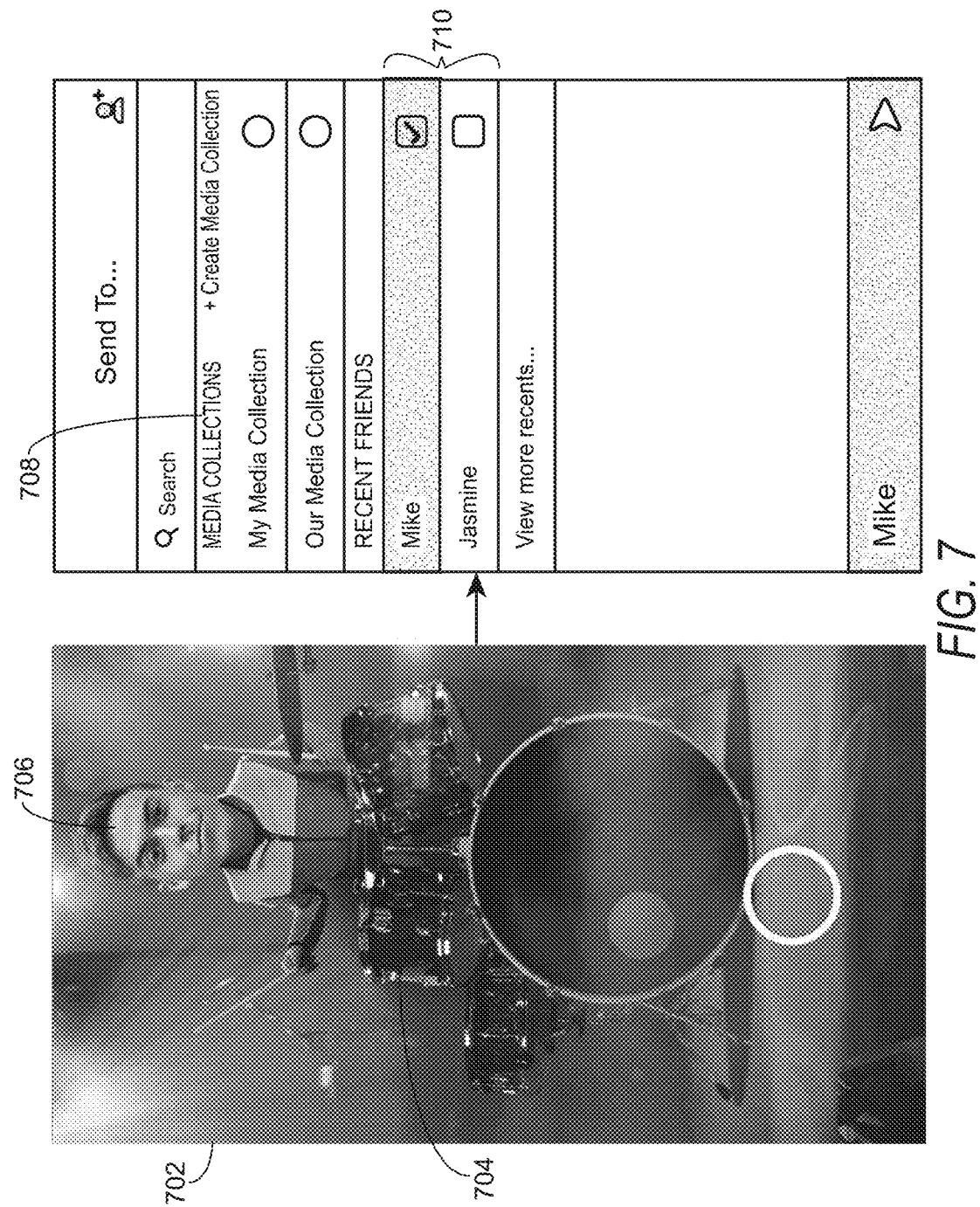
FIGS. 7-9 illustrate example graphical user interfaces, according to some example embodiments.

FIG. 7 shows an example of an interactive message 702 where a user may add an image or video of himself to a band. A first interactive object 704 in the interactive message 702 may be a drummer. The user may capture an image or video of his face to add to the drummer. For example, the user may select an option on the display or elsewhere on the computing device to start capturing video of himself. The computing device may capture a video of the user and associate the video of the user with the first interactive object 704 of the drummer. In one example, the computing device may identify a portion of the video or image that may be captured and capture only the portion of the video or image. In this example, for instance, the computing device may detect the face of the user and only capture the face of the user to display as the face of the drummer 706. This will result in a smaller file size for the media content item. The image or video of the user (e.g., the user's face) is displayed in the first interactive object 704 of the drummer.

The user may indicate that he wishes to share the interactive message 702. For example, the user may choose to save the interactive message 702 as part of a media collection 708 for viewing later by the user or other users that have access to the media collection 708, or may send the interactive message 702 to one or more users 710. The computing device sends the interactive message 702 and the media content item (e.g., the image or video captured by the user) associated with the first interactive object 704 to the server computer.

In one example, the interactive message sent by the computing device may comprise a primary message (e.g., the interactive message and any associated data), metadata (e.g., data, such as a key-value data store, holding arbitrary information such as, unique identifiers corresponding to secondary media assets), secondary media assets (e.g., media content items such as images and videos), and script logic. The primary message on its own may be a regular message that may be shared with other users and included in one or more media collections. The addition of metadata, secondary media assets, and script logic, enable interactivity.

In one example, the metadata is injected into the primary message and is sent from one computing device to another and the secondary media assets are uploaded from the sending computing device to the server computing system independently from the primary message and metadata. In one example, the secondary media assets are also downloaded on the receiving computing device independently from the primary message and metadata. In one example, the secondary media assets are not embedded in the primary message the same way the metadata may be. The script logic combines metadata and the secondary media assets to generate or reproduce the interactive message. The script logic may already be incorporated into the computing device (e.g., part of an application such as a messaging application) or if not, a separate process may initiate retrieving the script logic from a content delivery system (e.g., server system 108).

Thus, using the current example, the computing device may add new entries to the metadata associated with the media content item (e.g., secondary asset) for the interactive message, send the interactive message 702 (e.g., the primary message), the metadata, and the media content item (e.g., the image or video captured by the user) associated with the first interactive object 704 to the server computer. In another example, the server computer may add the new entries to the metadata to generate serialized data, as described next.

Returning to FIG. 5, after receiving the first media content item associated with the first interactive object, the server computer stores the first media content item and generates serialized data for the interactive message by generating a first session data item comprising a unique identifier for the media content item (e.g., secondary media asset) for the first interactive object of the interactive message and a location for where the first media content item is stored, as shown in operation 504. For example, the first session data item may comprise an identifier (e.g., a unique identifier) for the first media content item and a location for where the first media content item is stored. For example, the first session data item may comprise a key-value pair where the key is the unique identifier for the media content item (e.g., video 1:123456) and the value is the location where the media content item is stored (e.g., a URL). Other data may also be stored (e.g., "score:300", "timeElapsed:60", etc.). The unique identifier for the media content item may be serialized as part of the metadata for the interactive message, as described above. The first session data item may be stored as part of the metadata for the interactive message, as described above. In another example, the metadata may be generated by the computing device, as explained above (e.g., by adding the first session data item to the metadata of the interactive message).

In operation 506, the server computer stores the serialized data comprising the first session data item with the interactive message. For example, the server computer may store the serialized data and interactive message in one or more databases 120. The first media content item may also be stored in one or more databases 120.

In operation 508, the server computer sends the serialized data for the interactive message comprising the first session data item to a second computing device. For example, the server computer may send the interactive message with the serialized data (e.g., metadata attached as a binary blob). The second computing device receives the serialized data, renders the interactive message using the first session data item, and displays the rendered interactive message comprising the first media content item. For example, the second computing device may de-serialize the serialized data (e.g., decode the binary blob or other format) to recreate the interactive message. The second computing device may render the interactive message by retrieving the first media content item using the identifier for the first media content item and the location for where the first media content item is stored. The second computing device displays the interactive message similar to what is displayed in the interactive message 702 in FIG. 7. The second computing device may display the interactive message immediately upon receiving it or may display it upon request from a user to view the interactive message.

Figure 8:
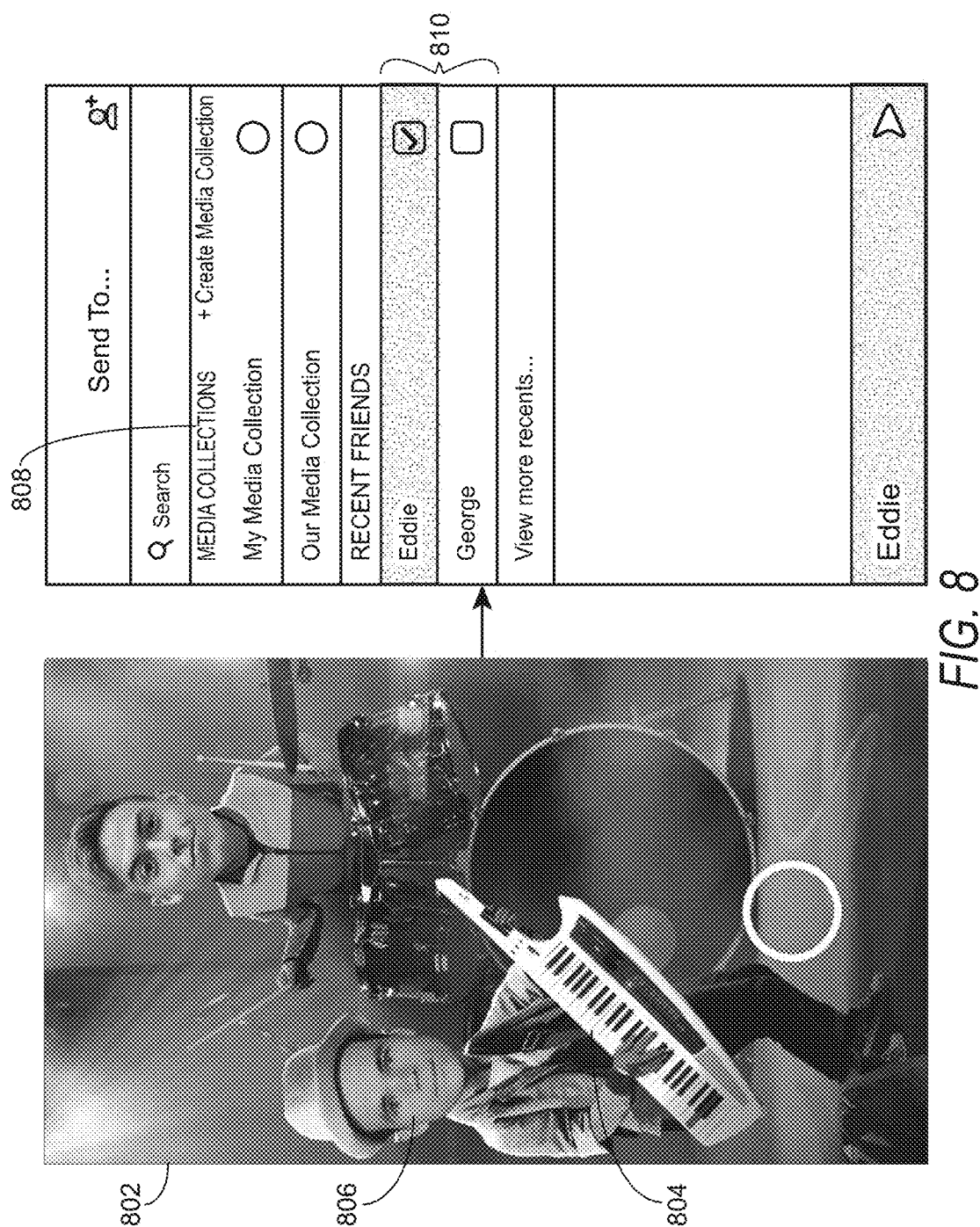

FIG. 8 shows an example of an interactive message 802 where the second user may add an image or video of himself to the band. A second interactive object 804 in the interactive message 802 may be a keyboard player. The user may capture an image or video of his face to add to the keyboard player, as explained above for the drummer. The image or video 806 of the user is displayed (e.g., as the face portion of the keyboard player) in the second interactive object 804 of the keyboard player. In one example, the second interactive object 804 (and any other objects other than the objects that have already been included by other users) is not visible until the second user is viewing the interactive message 802. In one example, the second interactive object 804 may appear when the user is viewing the interactive message 802, indicating that the user may add content to the interactive message 802.

The user may indicate that he wishes to share the interactive message 802. For example, the user may choose to save the interactive message 802 as part of a media collection 808 for viewing later by the user or other users that have access to the media collection 808, or may send the interactive message 802 to one or more users 810. The computing device sends the interactive message 802 and the media content item (e.g., the image or video 806 captured by the user) associated with the second interactive object 804 to the server computer.

Returning to FIG. 5, in operation 510, the server computer receives a second media content item associated with a second interactive object of the interactive message (e.g., a video of a second user's face associated with a keyboard player of a band). For example, the server computer may receive the second media content item from the second computing device.

In operation 512, the server computer stores the second media content item and generates serialized data for the interactive message by generating a second session data item comprising an identifier (e.g., a unique identifier) for the second media content item and a location for where the second media content item is stored and adds the second session data item to the serialized data. As described above for the first session data item, the second session data item may comprise an identifier (e.g., a unique identifier) for the second media content item and a location for where the second media content item is stored. As also described above, in another example, the metadata may be generated by the computing device, as explained above (e.g., by adding the first session data item to the metadata of the interactive message).

In operation 514, the server computer stores the serialized data comprising the first session data item and the second session data item with the interactive message. For example, the server computer may store the serialized data in one or more databases 120. The second media content item may also be stored in one or more databases 120.

In operation 516, the server computer sends the serialized data for the interactive message comprising the first session data item and the second session data item to a third computing device. For example, the server computer may send the interactive message with the serialized data (e.g., metadata attached as a binary blob). The third computing device receives the serialized data and renders the interactive message using the first session data item and the second session data item and displays the rendered interactive message comprising the first media content item and the second media content item. For example, the third computing device may de-serialize the serialized data (e.g., decode the binary blob or other format) to recreate the interactive message. The third computing device may render the interactive message by retrieving the first media content item using the identifier for the first media content item and the location for where the first media content item is stored, and retrieve the second media content item using the identifier for the first media content item and the location for where the second media content item is stored. The second computing device displays the interactive message similar to what is displayed in the interactive message 802 in FIG. 8. The third computing device may display the interactive message immediately upon receiving it or may display it upon request from a user to view the interactive message.

Figure 9:
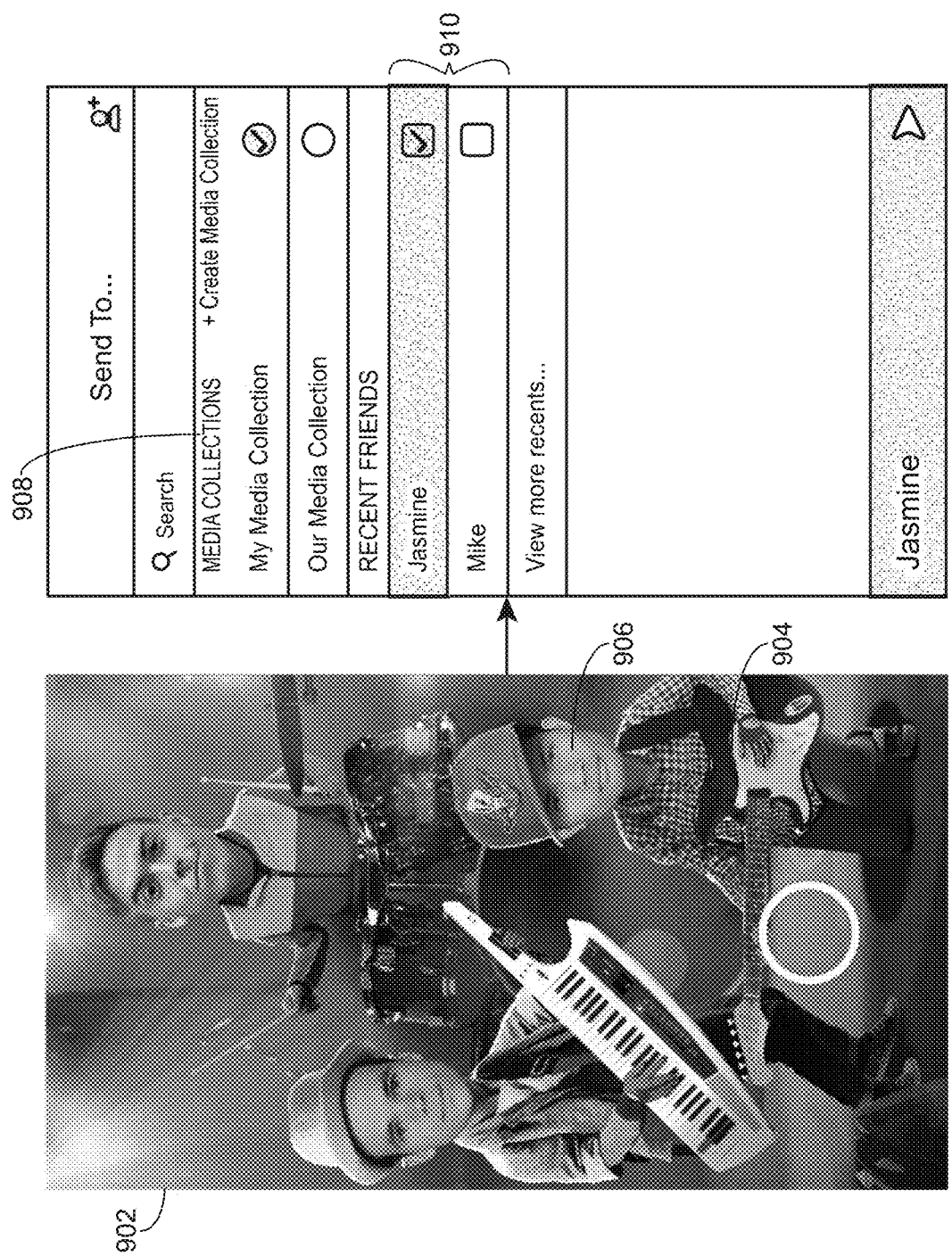

FIG. 9 shows an example of an interactive message 902 where the third user may add an image or video of himself to the band. A third interactive object 904 in the interactive message 902 may be a guitar player. The user may capture an image or video of his face to add to the guitar player, as explained above for the drummer. The image or video 906 of the user is displayed in the third interactive object 904 of the guitar player.

The user may indicate that he wishes to share the interactive message 902. For example, the user may choose to save the interactive message 902 as part of a media collection 908 for viewing later by the user or other users that have access to the media collection 908, or may send the interactive message 902 to one or more users 910. The computing device sends the interactive message 902 and the media content item (e.g., the image or video 906 captured by the user) associated with the third interactive object 904 to the server computer.

The server computer receives the third media content item and continues the process, as described above. For purposes of example, the process above is described using three computing devices associated with three users. In other examples, there could be more or fewer computing devices and users. Furthermore, each interactive message may be sent to just one computing device or may be sent to multiple computing devices. Also, each interactive message may be sent back to a computing device that previously sent the interactive message.

In another example embodiment, an interactive message may comprise a game that may be played and shared between users. For example, the interactive message may be a challenge experience where a first user plays a game and then challenges a second user (or more than one user) to beat their high score. This asynchronous game may be played by users by sending a user-generated interactive message back and forth to each other (or amongst multiple users). For example, a user may select a game in a messaging application running on a first computing device. The game may capture his image (e.g., a video or photograph of the user's face) and, once the game is resolved by the first user, the first computing device generates a message comprising the first user's image and the results of the game (e.g., a score or win/loss state). The first user can then customize the generated message (e.g., add text or audio, add an image or video, add a media overly, etc.) and send it to a second user (or multiple users) as a "challenge" to beat his score. The first computing device sends the generated message to a second computing device (e.g., via a server system 108 as described above). When the second user receives the generated message, she can interact with the generated message to enter the game and try to beat the score of the first user. In some cases, the face of the original challenger is used in the new game session. These sessions then go back and forth between friends until one decides not to respond.

Figure 10:
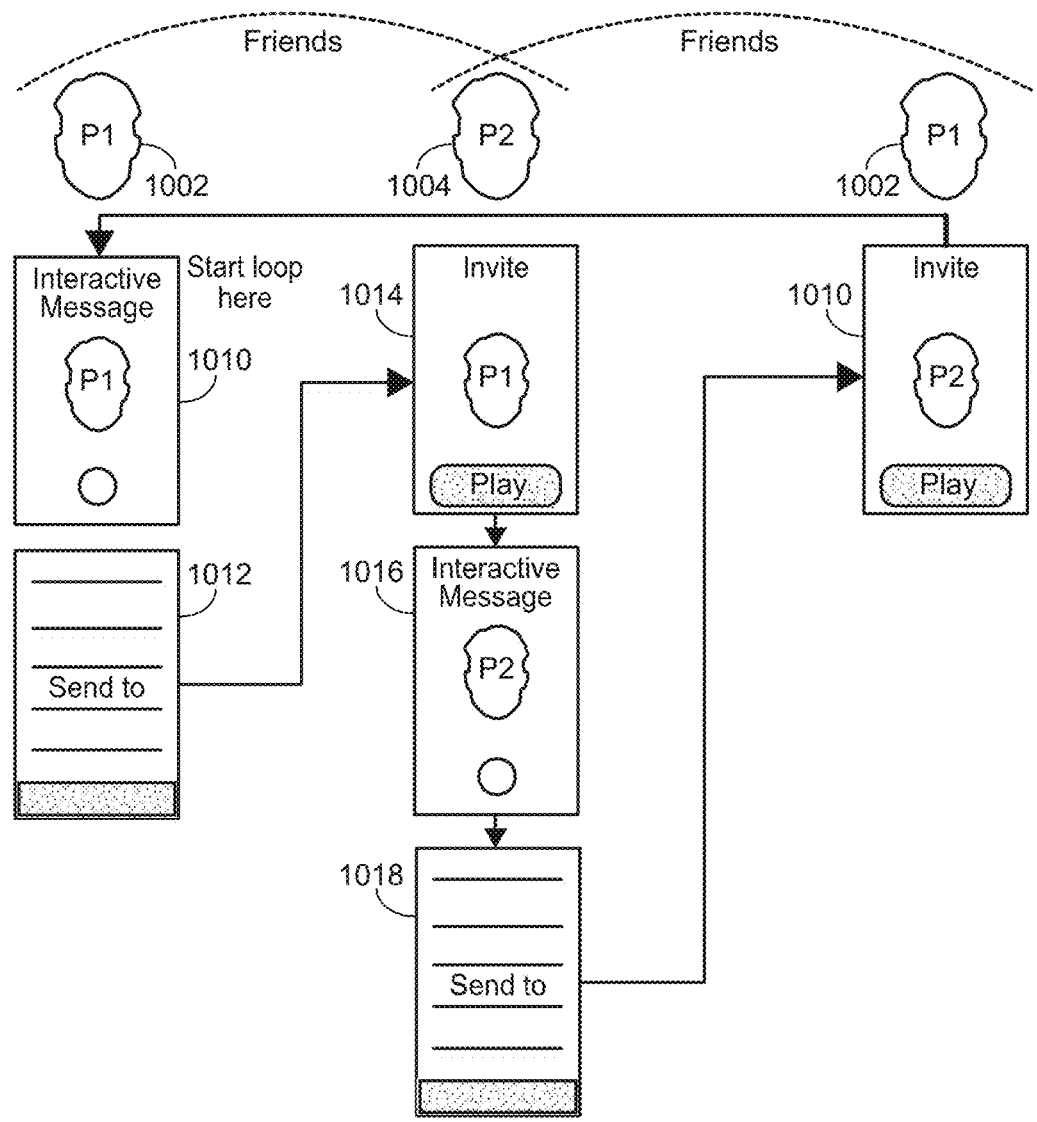
FIG. 10 is a diagram illustrating an example of sharing interactive messages, according to some example embodiments.

FIG. 10 illustrates an example of a game played between two users P1 (1002) and P2 (1004). A first user P1 1002 using a computing device 1010 generates an interactive message by playing a game. The first user P1 1002 may then send 1012 the interactive message to a second user P2 1004. The second user P2 1004 receives the interactive message at a second computing device 1014 and generates an interactive message 1016 by playing the game. The second user P2 1004 may then send 1018 the interactive message 1016 back to the first user P1 1002 (via the second user's device 1014).

Figure 11:
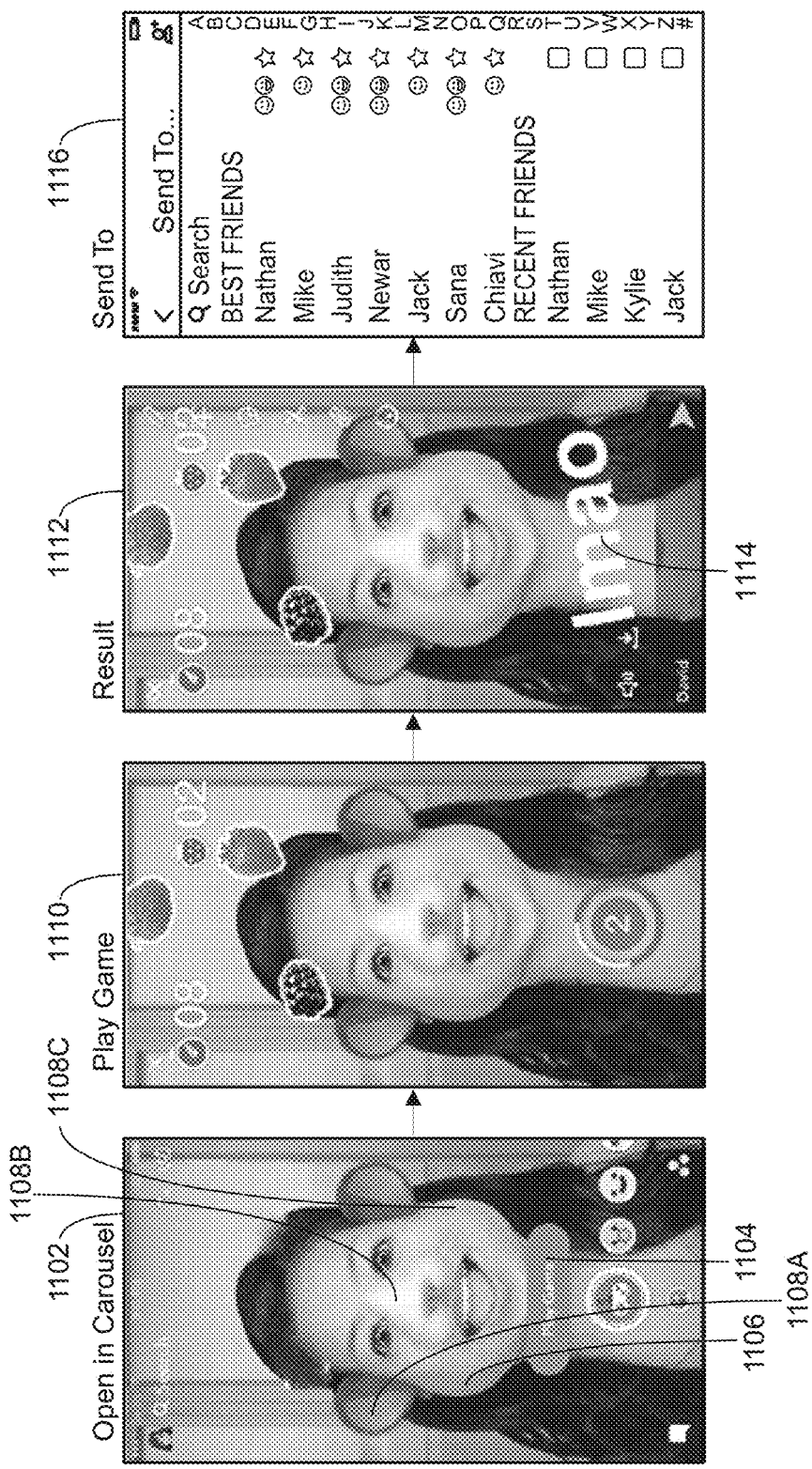
FIGS. 11-17 illustrate example graphical user interfaces, according to some example embodiments.

FIG. 11 illustrates an example of a set of graphical user interfaces (GUIs) on a display of a computing device that show an example game 1102 that may be played between two or more users via interactive messages. A computing device may detect an indication from the first user to play the game 1102. For example, the first user may interact with a touch screen or other control on the computing device, such as pressing the "Play Game" button 1104. The game 1102 may comprise an image 1106 of the first user and may optionally comprise creative tools 1108A-1108C that have been applied by the user to the image 1106 of the user (e.g., media overlays, text, audio, etc.). The GUI 1110 shows an example of the first user playing the game 1102. The GUI 1112 shows an example of results of the game 1102 with some additional text 1114 that the first user has added to the results of the game 1102 to generate an interactive message to send to another users. The first user may apply creative tools, text, audio, or the like to the game results. The GUI 1116 shows an example of a selection of users to which the first user may send the interactive message. The first user may send the interactive message to any number of friends or other users. For example, the first user may send the interactive message with game results to a second user.

Figure 12:
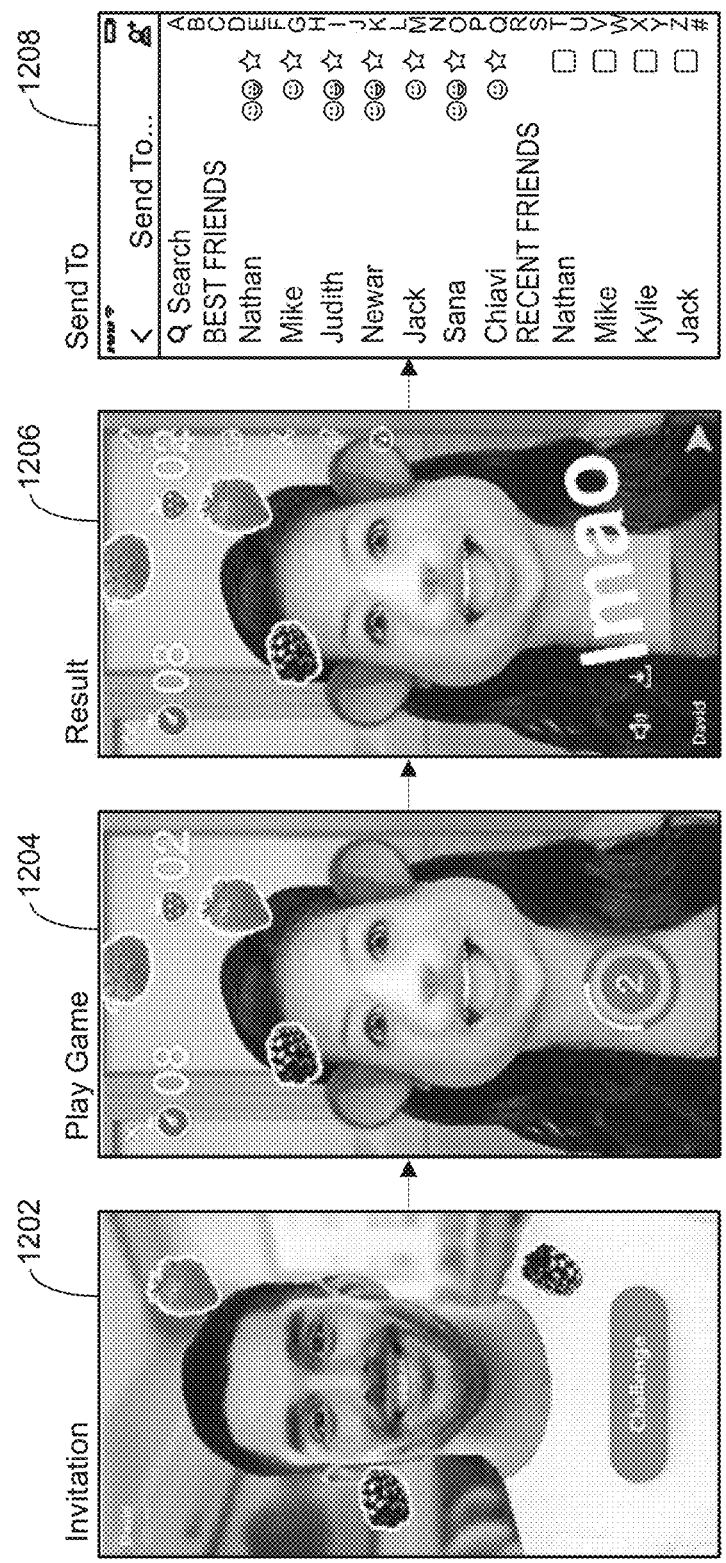

FIG. 12 illustrates an example set of GUIs on a display of a computing device that shows a second user receiving an invitation from the first user in the form of an interactive message 1202. The GUI 1204 shows an example of the second user playing the game (e.g., the game 1102), the GUI 1206 shows an example of results of the game, and the GUI 1208 shows an example of a selection of users to which the second user may send the interactive game, as explained above. The second user may send the game back to the first user, and/or to any number of other users.

In this example of interactive messages generated by playing a game, the serialized data (e.g., the metadata for the interactive message) may include a score achieved by the ending player, all scores achieved by each player (e.g., each sender), and/or other data to indicate game status that may be used to display a game status or the like to a receiving user (e.g., highest score so far, to indicate to a receiving user that he won or lose, etc.).

Figure 13:
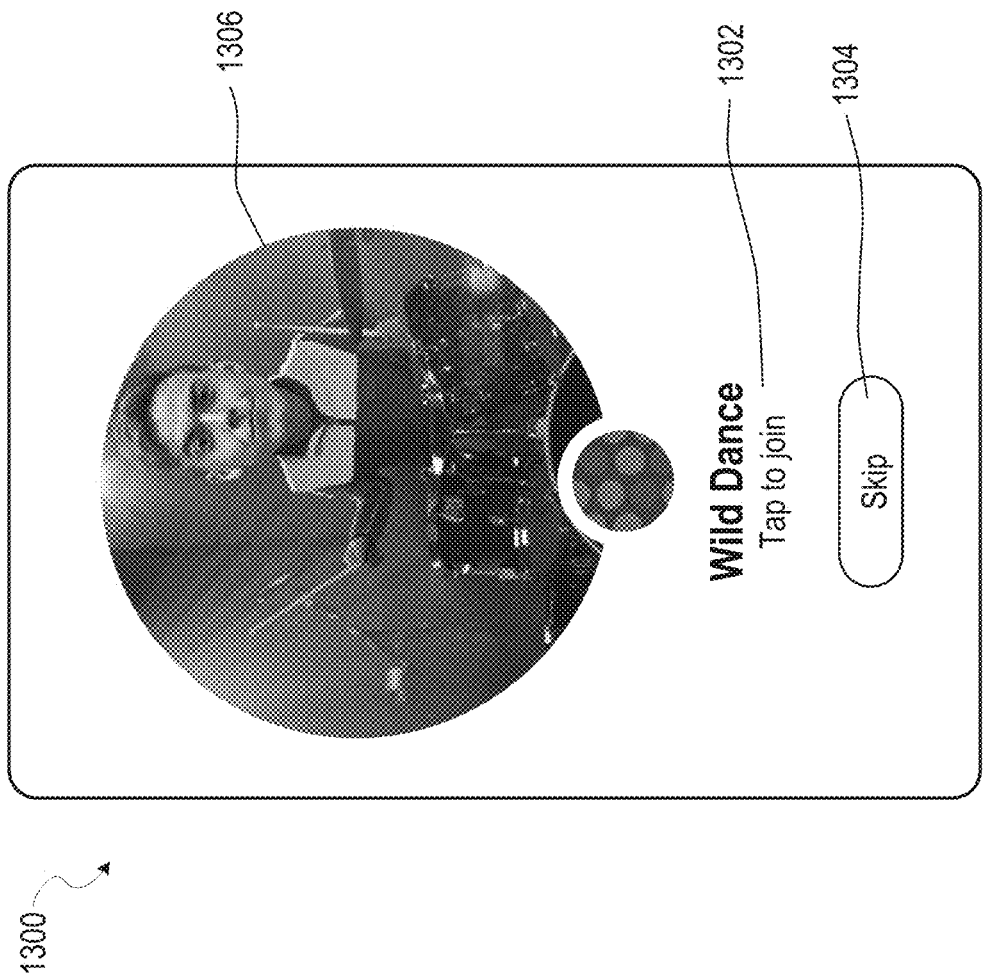

In one example embodiment, after a user receives an interactive message from another user, the interactive message is be displayed on the computing device of the user receiving the interactive message and after displaying the interactive message, the computing device may display a reply interstitial which causes the interactive message to animate to a circle on the reply interstitial. An example reply interstitial 1300 is shown in FIG. 13. The reply intestinal may provide a mechanism 1302 (e.g., one or more user interface elements) to allow the second user to join or add to the interactive message (e.g., "Tap to join" or "Tap to play") or a mechanism 1304 to skip interacting with the interactive message (e.g., "Skip").

In one example, a focal point of the interactive message animates in the circle 1306 in the reply interstitial. The focal point may be variable based on what the most exciting or interesting part of the interactive message. In one example, the focal point may be one or more faces in the interactive message or may be a predetermined area within the interactive message. In one example, the computing device may determine what to display in the circle based on determining a region of interest in the interactive message by determining one or more faces or other action areas in the interactive message.

In one example, the focal point may be a still image displayed in the circle in the reply interstitial. In another example, the focal point may continue to animate in the circle. For example, the user shown in the focal point (e.g., the drummer in FIG. 13) may continue to be shown moving (e.g., playing the drums in FIG. 13).

Once the user indicates that he would like to interact with the interactive message (e.g., join, add content, etc.), the computing device displays the interactive message to be edited, as described in further detail above. For example, the computing device allows the user to capture a media content item, such as an image or video, to add to the interactive message, use media overlays, add text, and the like.

Figure 14:
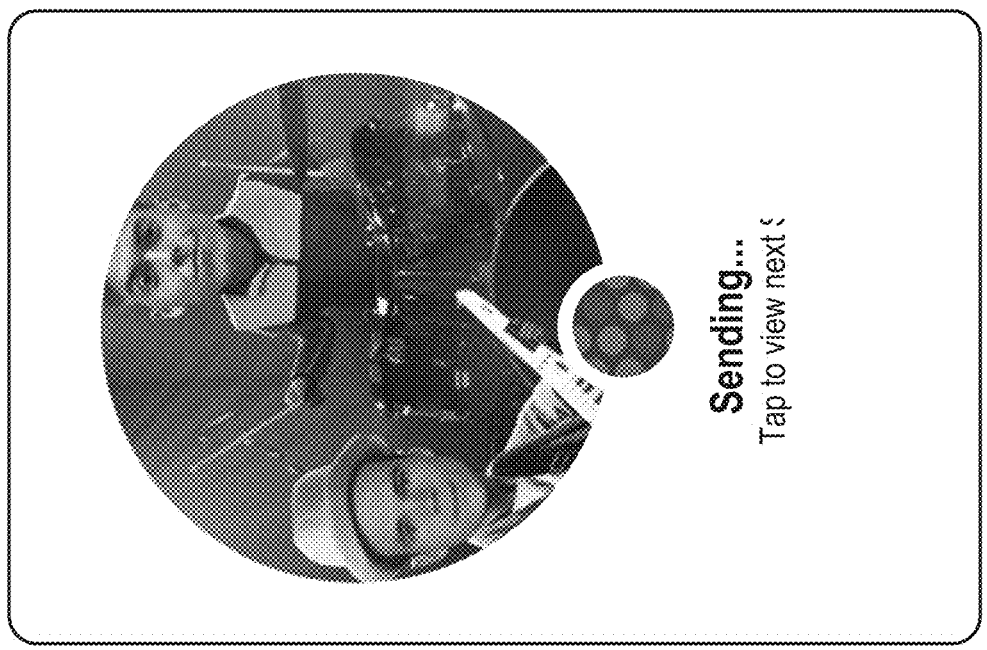
Figure 15:
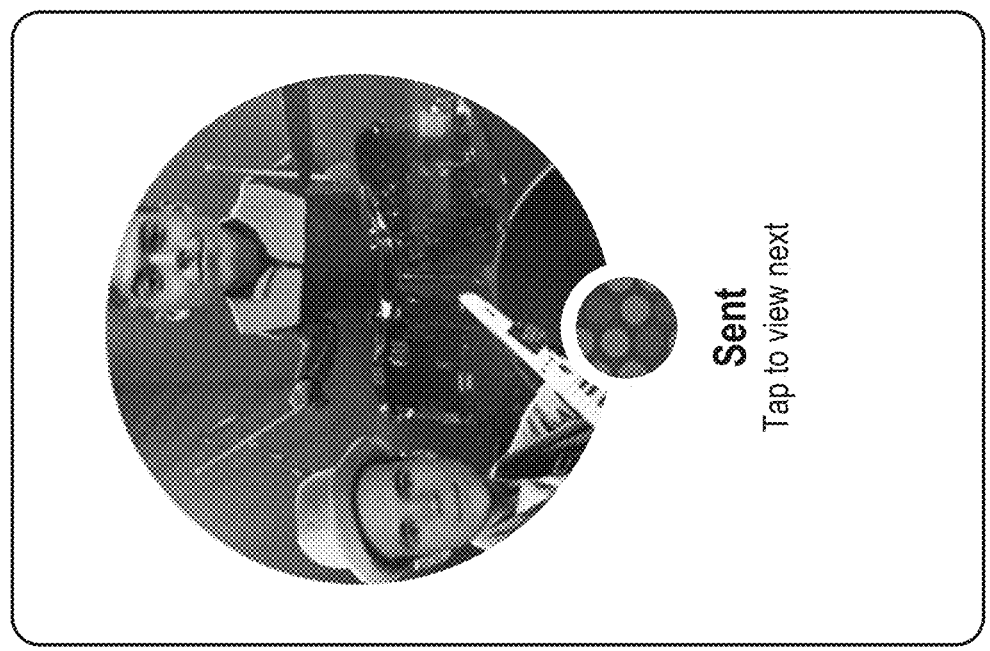

In other example embodiments an interstitial may also be used to indicate that the computing device is sending the interactive message to one or more other users or that the interactive message has been sent to one or more other users. FIG. 14 shows an example interstitial 1400 indicating an interactive message is being sent and FIG. 15 shows an example interstitial 1500 indicating that the interactive message has been sent.

In one example embodiment, interactive messages may be available based on a particular geolocation, based on a particular event, for a subset of users, and so forth. In this example, a user who qualifies for accessing an interactive message may generate and send the interactive message to a user who does not qualify for access the interactive message. For example, a first user may qualify for accessing an interactive message based on the first user's geolocation. The first user may send the interactive message to a second user, but the second user may not be in the geolocation for accessing the interactive message. Example embodiments allow for the second user to view and interact with the interactive message even though the second user is not in the geolocation for accessing the interactive message.

For example, a computing device associated with the second user receives the interactive message. The interactive message may comprise a unique identifier for the interactive message. Upon receiving the interactive message, the computing device may parse the unique identifier and check for the presence of metadata and assets. If the interactive message and metadata are present in the client cache for the computing device, the computing device does nothing and waits for user action. If metadata is present but assets are not yet available, the computing device will initiate download of assets on a predefined schedule. In one example, this schedule may be up to the computing device. If no metadata is found by the computing device, the computing device makes a request to unlock the interactive message via an unlock endpoint. The unlock endpoint unlocks the interactive message for the user and returns all geofilter metadata about the interactive message. The computing device will use this metadata to download assets and launch the interactive message based on user actions. In one example, the interactive message may be unlocked for a predetermined time period (e.g., 24 hours).

Figure 16:
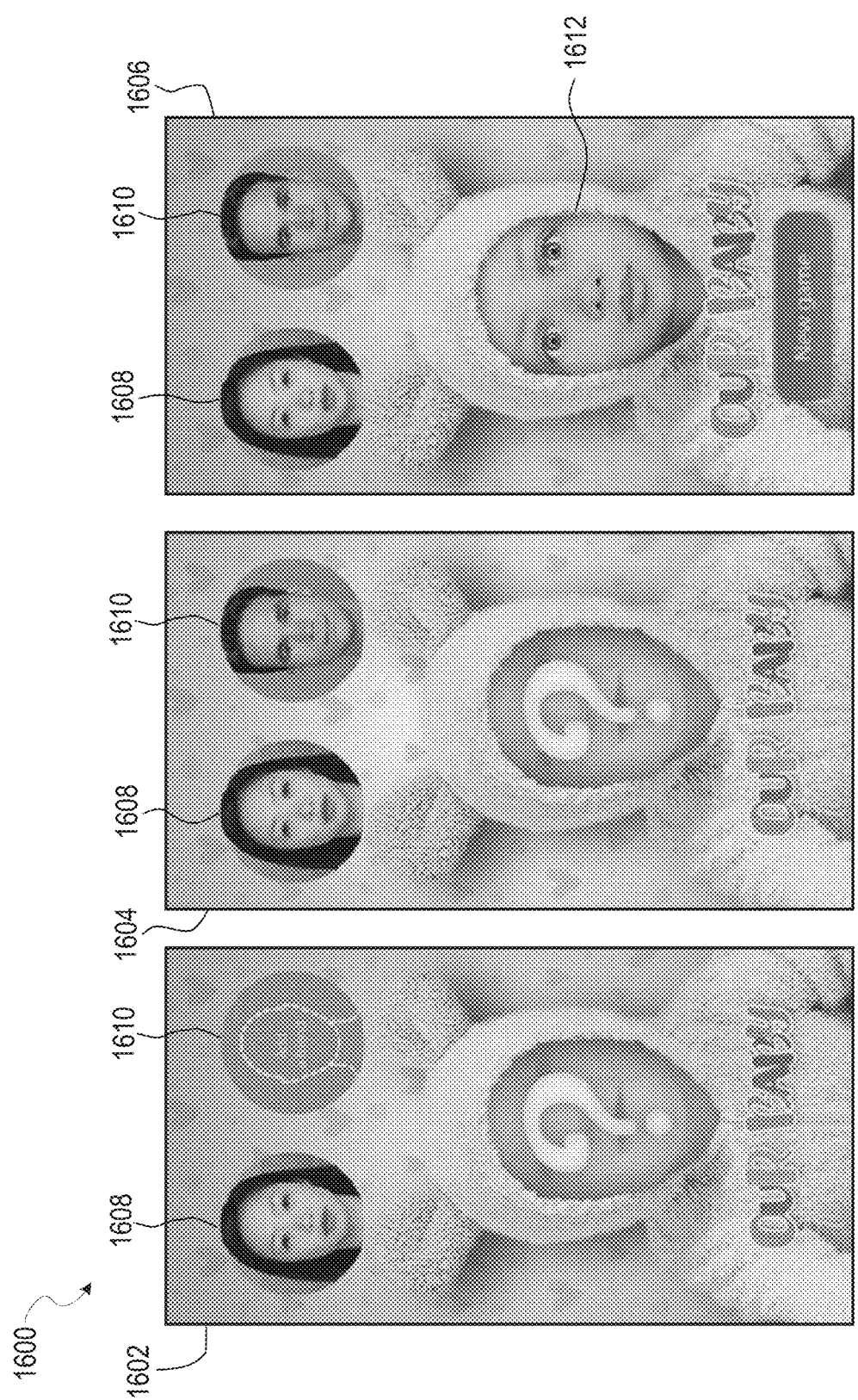

FIG. 16 illustrates an example of a set of GUIs 1602, 1604, and 1606 on a display of a computing device (e.g., client device 110) that show an example interactive message that may be shared between two or more users. In this example, a first user captures a first media content item, such as an image of herself, via a computing device. The computing device displays the user's image in a first location 1608 in the interactive message, as shown in GUI 1602. In one example, the location 1608 is a first interactive object, as described above. The first user may then send the interactive message to a second user or may capture a second media content item such as an image of the second user (or another person), via the computing device. If the first user captures an image of another user, the computing device displays the other user's image in a second location 1610 in the interactive message, as shown in GUI 1604. In one example, the location 1610 is a second interactive object, as described above. If the first user sends the interactive message to a second user via the computing device, a second computing device associated with the second user may receive the interactive message and allow the second user to capture and add a media content item, such as an image, to the interactive message. For example, the second computing device may display the interactive message with the first user's image in the first location 1608 and capture the second user's image and display the second image in the second location 1610 of the interactive message, as shown in GUI 1604.

Once the two images are captured, the computing device (e.g., client device 110 or server/server system such as media content processing system 118 or server system 108) generates a third media content item (e.g., a new image) based on the first user's image and the second user's image. In this example, it may be an image of what a "baby" of the two users may look like. In this example, two human faces are used. In other embodiments any two or more objects may be used (e.g., humans, animals, cartoon characters, etc.). The third image may be displayed in a third location 1612 of the interactive message, as shown in GUI 1606.

Figure 17:
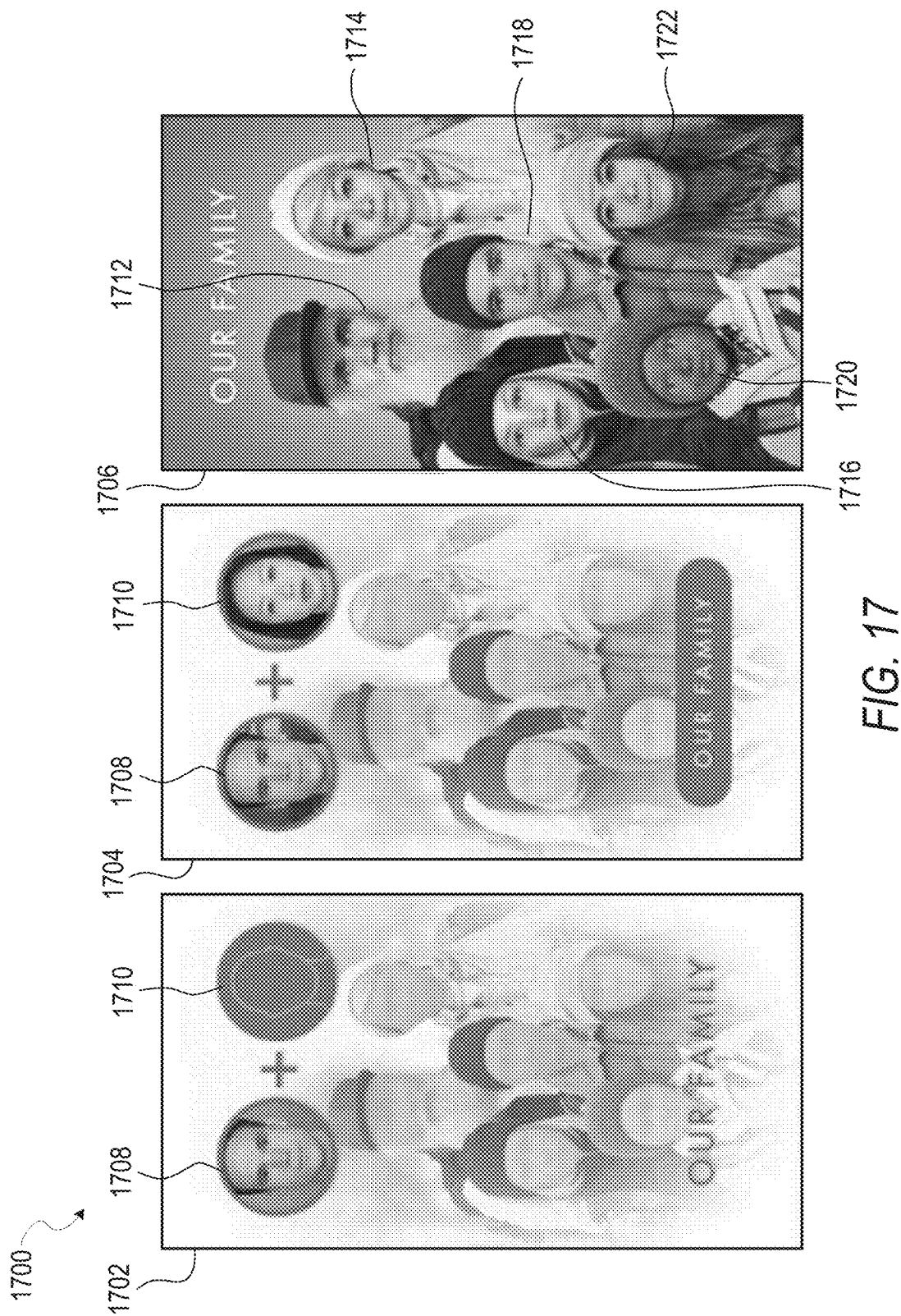

FIG. 17 illustrates an example of a set of GUIs 1702, 1704, and 1706 on a display of a computing device that show another example interactive message that may be shared between two or more users. Similar to the example in FIG. 16, one or two users may capture their images using a first and/or a second computing device and one or more new images may be generated based on the two captured images. The first image captured is displayed in a first location 1708, a second image captured is displayed in a second location 1710, as shown in GUI 1702 and GUI 1704. In the example in FIG. 17 several new images 1712-722 are generated from the first image and the second image to create a "family" as shown in GUI 1706.

Figure 18:
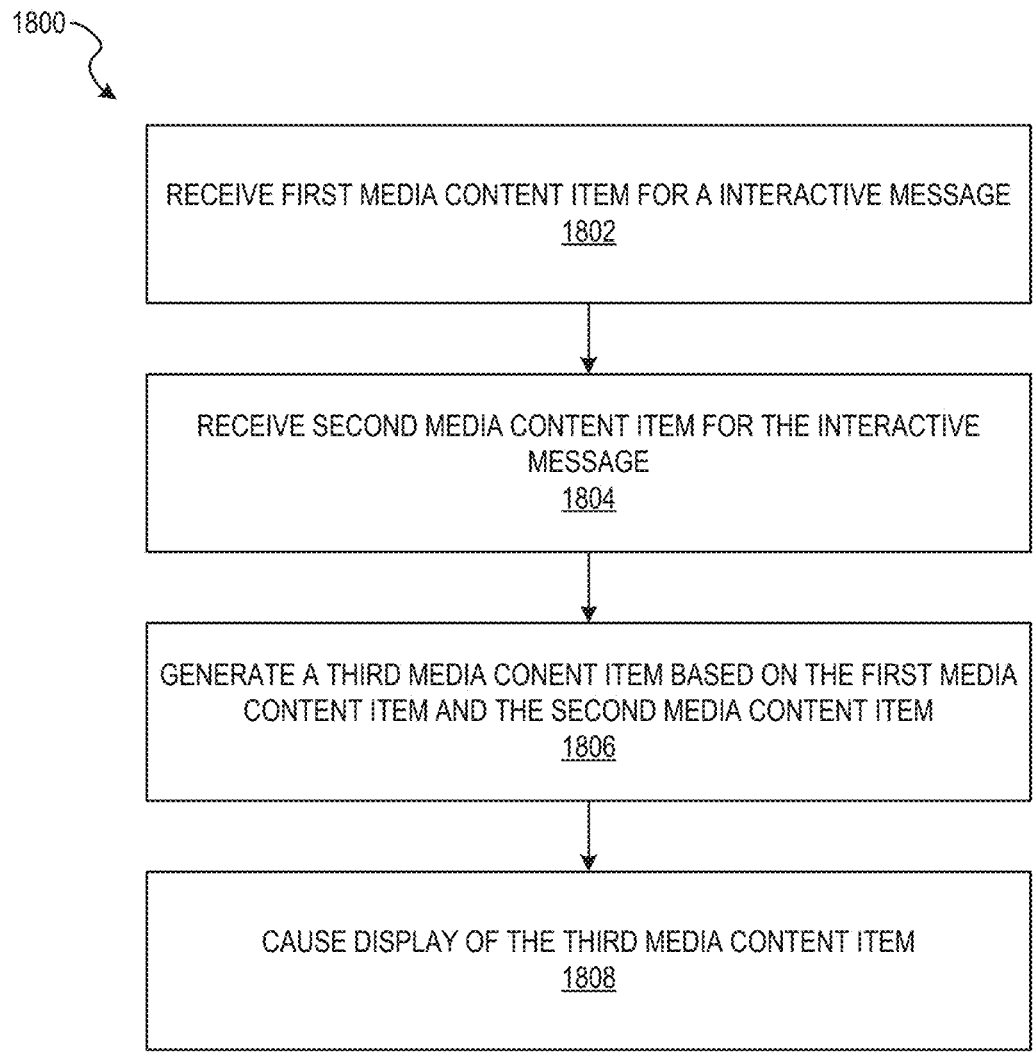
FIG. 18 is a flow chart illustrating aspects of a method, according to some example embodiments.

FIG. 18 is a flow chart illustrating aspects of a method 1800, for generating a third image in an interactive message from at least a first and a second image, according to some example embodiments. For illustrative purposes, the method 1800 is described with respect to the networked system 100 of FIG. 1 and the example GUIs in FIGS. 16 and 17. It is to be understood that the method 1800 may be practiced with other system configurations in other embodiments.

In operation 1802, a computing device (e.g., client device 110, or server/server system such as media content processing system 118 or server system 108) receives a first media content item for an interactive message. In one example, the first media content item is associated with a first interactive object of the interactive message, as explained above. As explained above with respect to FIGS. 16 and 17, the first media content item may be captured by a first computing device. The computing device may receive the first media content item from the camera device and cause the first media content item to be displayed on a first computing device, as also explained above with respect to FIGS. 16 and 17. The first computing device may send the first media content item to a second computing device. The second computing device receives the first media content item and causes the first media content item to be displayed on the second computing device, as explained above with respect to FIGS. 16 and 17.

The second computing device may receive the first media content item from the first computing device directly or via server system 108. The server system 108 may receive the first media content item from the first computing device and send it to the second computing device to cause it to display on the second computing device.

In operation 1804, the computing device receives a second media content item for the interactive message. In one example, the second media content item is associated with a second interactive object of the interactive message, as explained above. In one example, a first user of a first computing device captures a second media content item using the first computing device and the second media content item may be displayed on the first computing device. In another example, a second user of the second computing device captures the second media content item using the second computing device and the first media content item and the second media content item may be displayed on the second computing device. The second media content item may also be sent by the second computing device to the first computing device (e.g., either directly or via server system 108) and the second media content item may be displayed on the first computing device. In this example, the server system 108 receives the second media content item and sends the second media content item to the first computing device, as explained above.

In operation 1806, the computing device generates a third media content item based on the first media content item and the second media content item. In one example, the third media content item comprises combined features of the first media content item and the second media content item. In one example, generating a third image comprises generating a first feature vector for the first image and a second feature vector for the second image, combining the first and the second feature vector to generate a combined feature vectors, and then rendering the third image, as shown in further detail in FIGS. 19 and 20.

Figure 19:
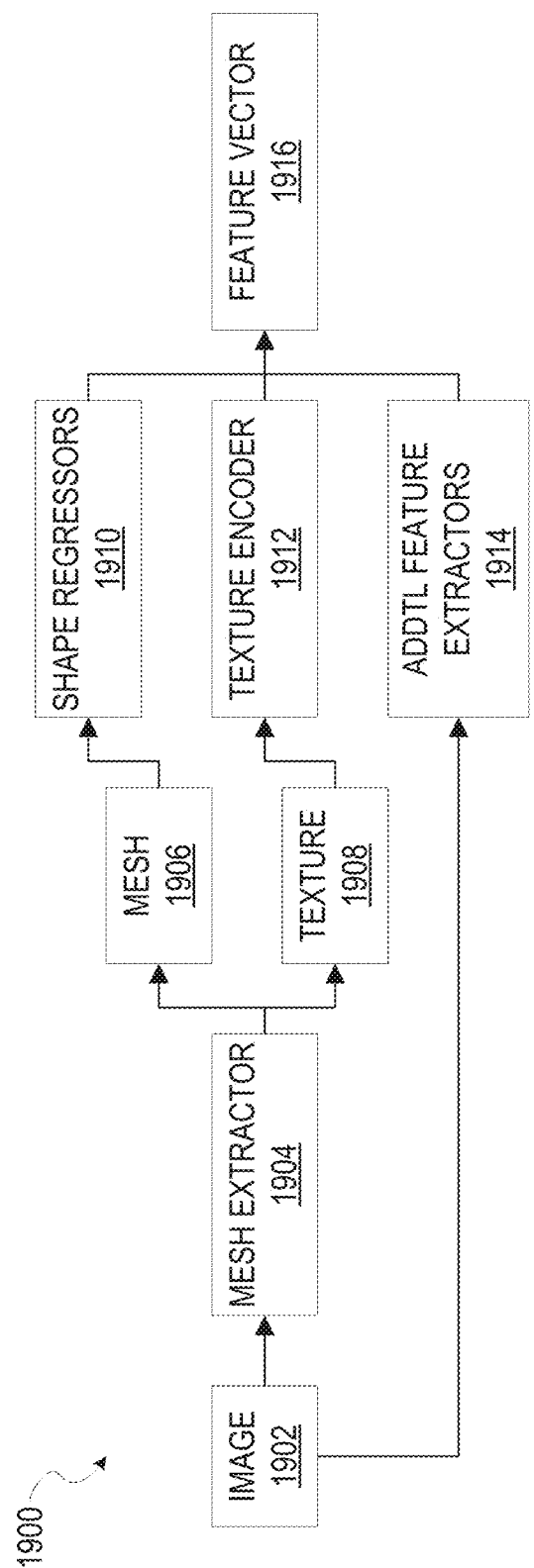
FIGS. 19-20 are block diagrams illustrating aspects of a method, according to some example embodiments.

FIG. 19 is a block diagram 1900 illustrating generating a feature vector 1916 from an image 1902. First the image 1902 is input into a mesh extractor 1904. The mesh extractor 1904 generates a mesh 1906 from the image using a mesh extraction algorithm (e.g., using any known or future mesh extraction technology that generates a mesh of an image). The mesh 1906 is a three-dimensional (3D) model of the image. For example, the mesh extractor 1904 generates a 3D model of a face, such as the face shown in 1608, 1610, 1708, and 1710 in the examples in FIGS. 16 and 17, indicating the depth of various facial features (e.g., eyes, nose, mouth, brow, cheeks, etc.) and the like. The mesh 1906 may be a 3D model of a face, scene, object, or the like, in the image.

The mesh extractor 1904 also generates a texture 1908 from the image. The texture 1908 indicates the color values in the mesh 1906. For example, the texture comprises color values for each pixel that maps to the mesh 1906. For example, the mesh extractor 1904 generates a texture 1908 indicating the color values for a face, such as the face shown in 1608, 1610, 1708, and 1710 in the examples in FIGS. 16 and 17.

In one example, the texture is a two-dimensional (2D) image. For example, the mesh extractor 1904 generates the texture 1908 (e.g., 2D image) by projecting the 2D image to a 3D model's surface for texture mapping (e.g., UV mapping).

Figure 21:
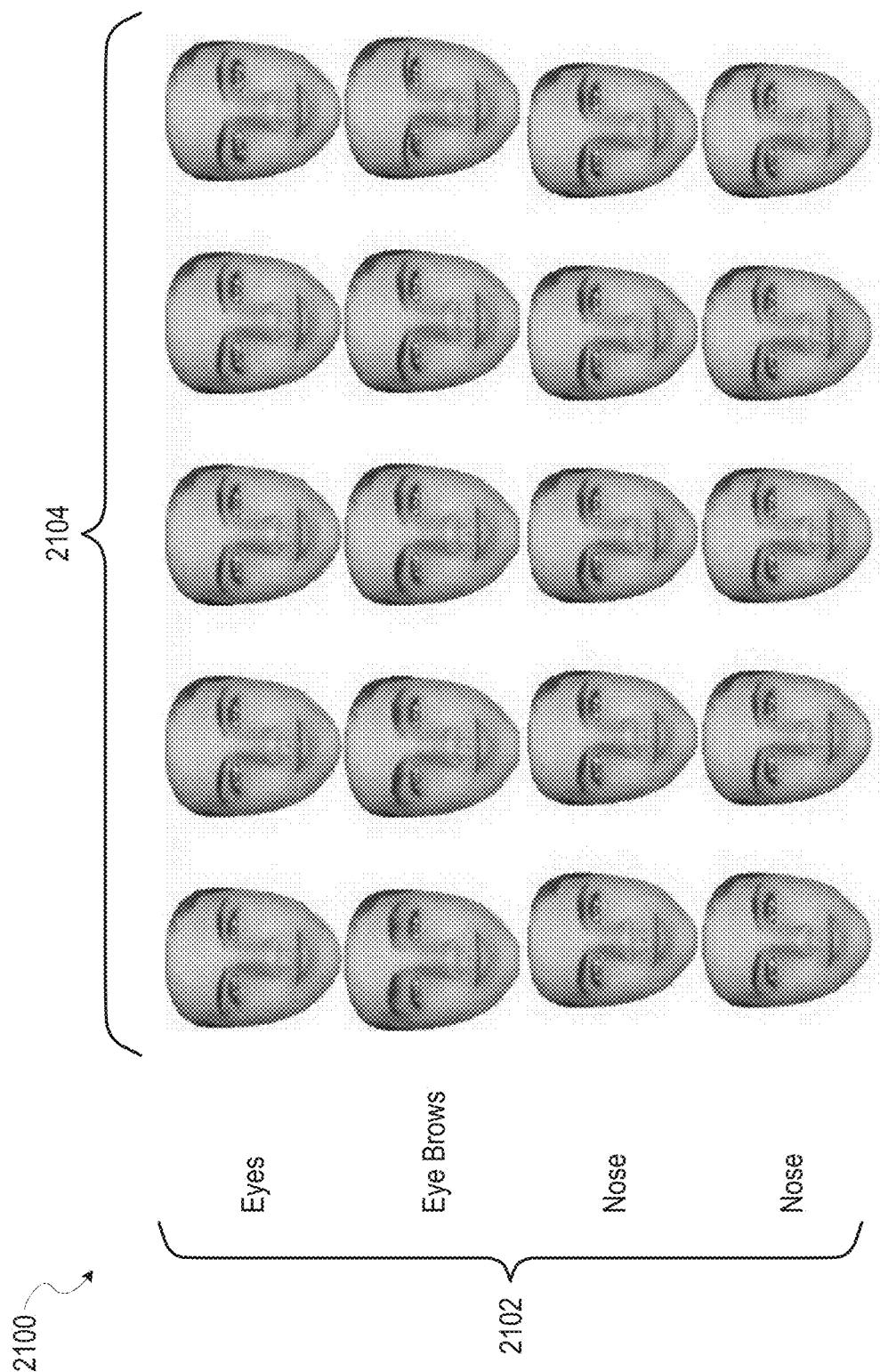
FIG. 21 illustrates sample shape features, according to some example embodiments.

The mesh 1906 is input into the shape regressors component 1910 to generate a shape type for one or more image features (e.g., facial features). In the example where the image contains a face, the shape regressors component 1910 generates a shape type for one or more facial features. In one example, the computing device extracts geometric features for each face (e.g., eyes, eyebrows, nose, mouth, etc.), using pre-trained mesh regressors. The shape regressors component 1910 estimates a feature type, such as a type of nose shape, eye shape, and so forth, for the image 1902 (in the example where the image is a face). FIG. 21 illustrates example shape features 2102 (e.g., eyes, eyebrows, and nose) and example feature types 2104 (e.g., geometric features) for each facial feature. Feature types can include a particular shape or width, such as an eyebrow shape (e.g., straight, curved) or eyebrow width (thin, thick), an eye, nose, or mouth shape, and the like.

Returning to FIG. 19, the texture 1908 is input into the texture encoder 1912. In one example the texture encoder 1912 extracts low-dimension texture representation using a pre-trained encoder (e.g. such as principal component analysis (PCA)). In another example, a neural network may be used to generate a low-dimension texture representation.

The computing device may extract additional features from the image 1902, using additional feature extractors 1914. In one example, the computing device extracts additional facial features from each face image or texture using a pre-trained regressor. In one example, additional features include hair style, hair color, skin color, eye color, and the like. In one example, the additional features are features that are not represented in the mesh 1906 or texture 1908 or that may be more accurately derived directly from the image 1902 than from the generated mesh 1906 or texture 1908. In one example, additional features, such as eye color and hair color, can be determined using a neural network to estimate the eye color, hair color, and so forth.

The output of the shape regressors 1910, texture encoder 1912, and any additional features from additional feature extractors 1914, is combined to generate a feature vector 1916 for the image. For example, the output of the shape regressors 1910 may be a vector representing the shapes of one or more features in the image, the output of the texture encoder 1912 may be a vector representing a texture of the image 1902, and the output of the additional feature extractors 1914 may be a vector representing any additional features. These three vectors would then be combined to generate the feature vector 1916 for the image.

Figure 20:
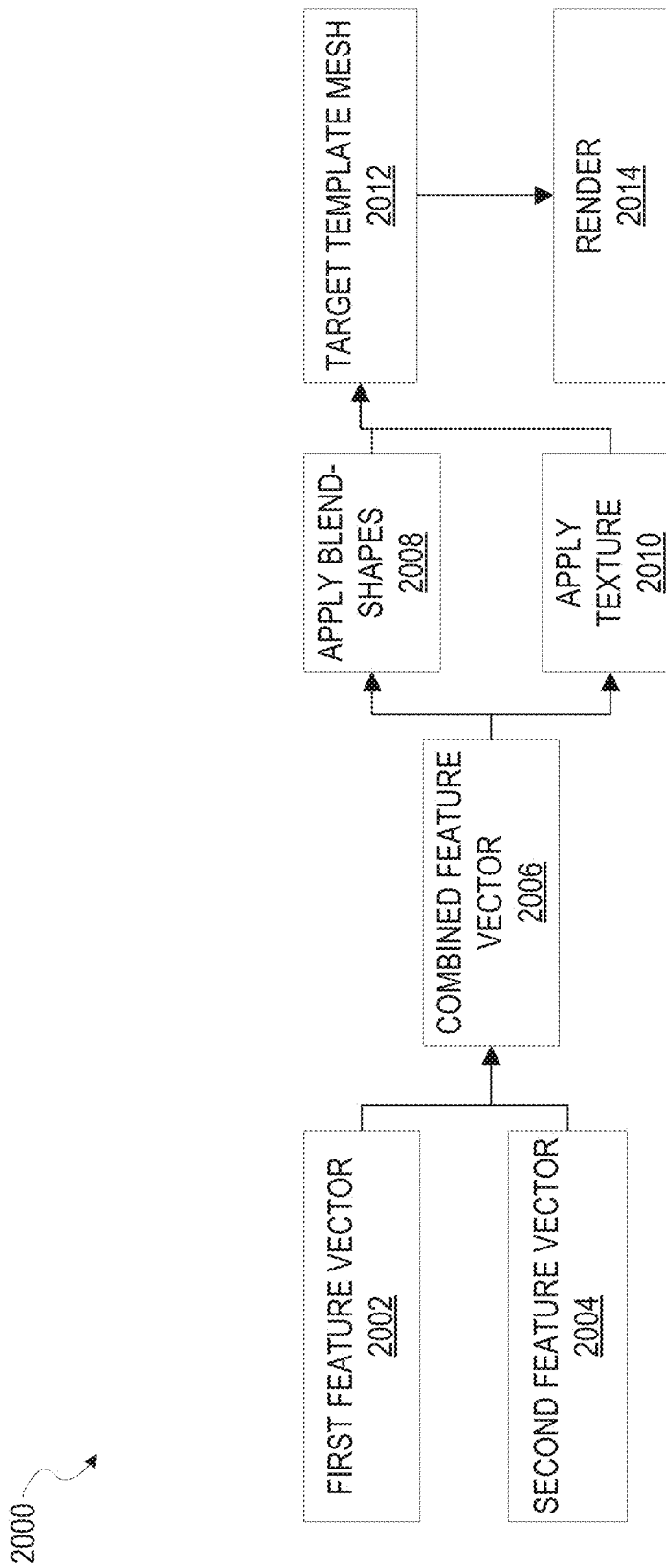

The computing device generates a feature vector 1916 for each image. In the example described above with two face images, the computing device may generate a first feature vector for a face in the first image and a second feature vector for the face in the second image. The block diagram 2000 of FIG. 20 illustrates how a first feature vector 2002 and a second feature vector 2004 are used to generate a combined feature vector 2006. In one example, the first feature vector 2002 and the second feature vector 2004 are combined by averaging the features represented in each feature vector to generate the combined feature vector 2006. In one example, the features may be weighted (e.g., using a predefined weight) so that certain features are more like the first image or more like the second image. For example, features for the first image (e.g., represented by the first feature vector 2002) may be weighted 0.8 and features from the second image (e.g., represented by the first feature vector 2004) may be weighted 0.2 such that a weight is associated with each feature vector. Thus, when combining the two feature vectors, the final feature vector may be more like the first image than the second image. In one example, the features represented in the first vector and the second vector are weighted according to the weight associated with the first vector and the weight associated with the second vector to generate the averaged features of the combined feature vector.

In another example, the weighting may be randomized so that the weight is different each time the computing device generates a combined feature vector 2006 (e.g., 0.5/0.5 in a first pass, 0.7/0/3 in a second pass, etc.). In this way, even if the same two images are used, the result third image will be different every time which may make for a more interesting user experience.

The combined feature vector 2006 is used to generate a new image (e.g., the third image), for example using a target template mesh 2012, and render component 2014 to render the image to be displayed on a computing device. In one example, rendering the third image from the combined feature vector comprises applying the combined feature vector to the target template mesh and rendering the target template mesh to generate the third image.

The template mesh may be a target mesh based on the use case of the application (e.g., for a "baby" of two users represented by the two images combined to form the third "baby" image). Thus, the template mesh may vary depending on the use case.

Figure 22:
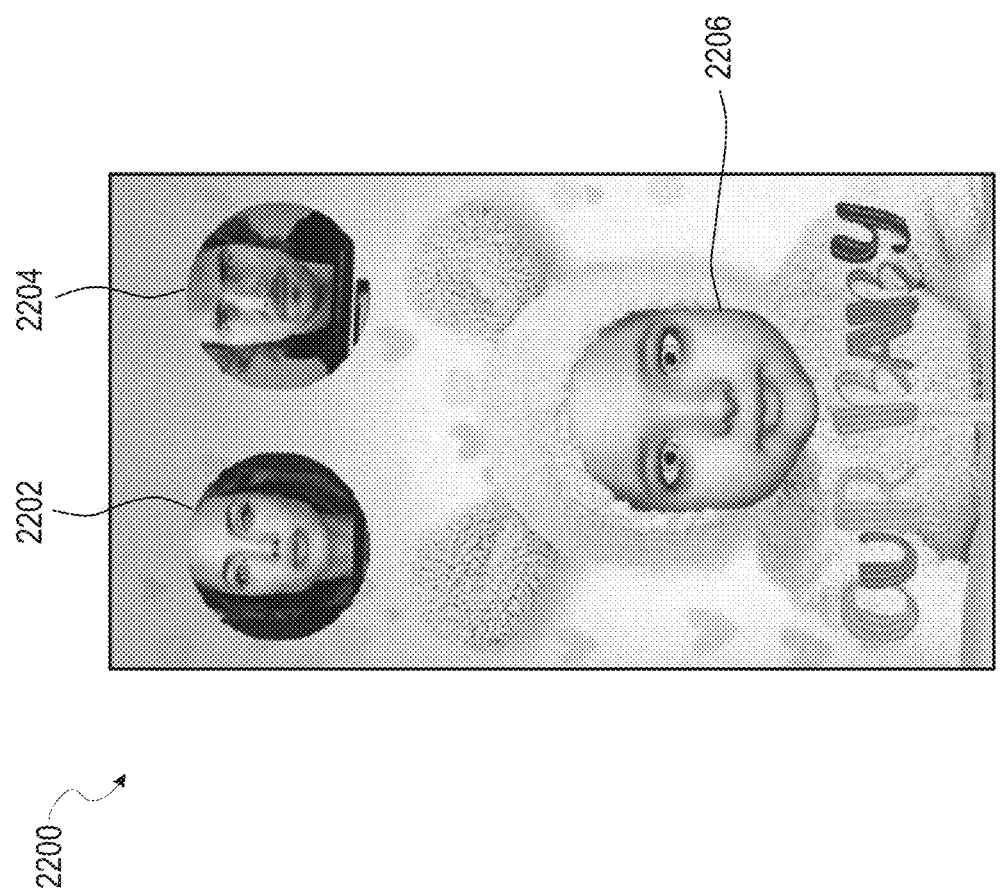
FIG. 22 illustrates an example graphical user interface, according to some example embodiments.

In one example, the combined feature vector is input into the apply blend-shapes component 2008 to blend a mesh represented in the combined feature vector 2006 into the target template mesh (e.g., allows a mesh to deform to one or more predefined shapes) and the combined feature vector 2006 is input into the apply texture component 2010 to apply the texture represented in the combined feature vector 2006 to the target template mesh 2012. For example, the computing device may re-project the combined texture (e.g., the combined feature vector which is describing texture) to the target domain using a pre-trained decoder. The computing device may apply geometric features on a target mesh using pre-trained or pre-designed blend-shapes. The computing device then renders the final mesh (e.g., with texture from the re-projected combing texture, blended shapes, desired eye color, and so forth). The target template mesh 2012 is then rendered by the render component 2012 to generate the final image. The computing device can then cause display of the final image on the computing device or other computing device. FIG. 22 shows an example GUI 2200 displaying a first image 2202, a second image 2204, and a third image 2204 that was generated from the first image 2202 and the second image 2204.

Figure 23:
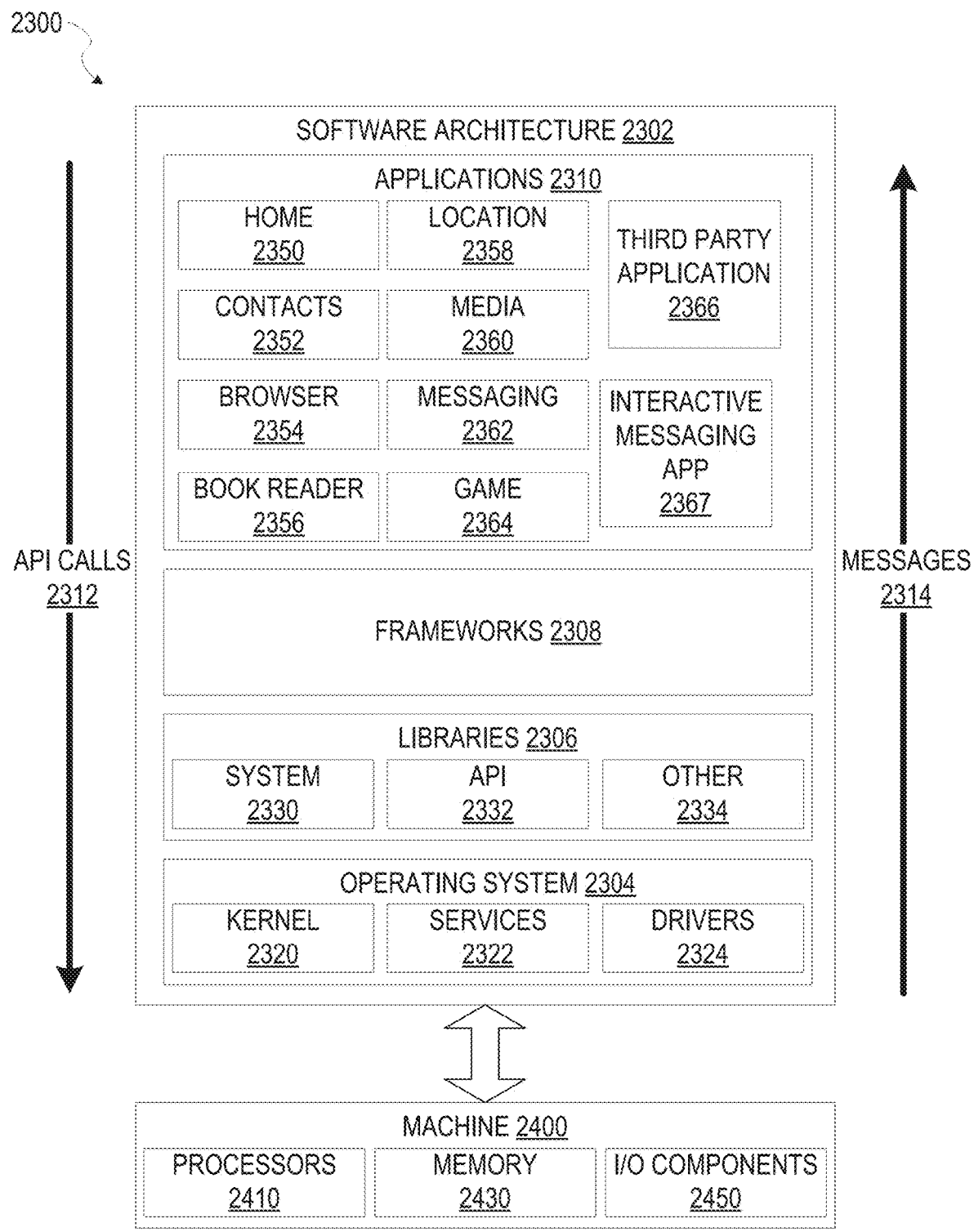
FIG. 23 is a block diagram illustrating an example of a software architecture that may be installed on a machine, according to some example embodiments.

FIG. 23 is a block diagram 2300 illustrating a software architecture 2302, which can be installed on any one or more of the devices described above. For example, in various embodiments, client devices 110, server systems 102, 112, 116, 118, 122, and 124 may be implemented using some or all of the elements of the software architecture 2302. FIG. 23 is merely a non-limiting example of a software architecture, and it will be appreciated that many other architectures can be implemented to facilitate the functionality described herein. In various embodiments, the software architecture 2302 is implemented by hardware such as machine 2400 of FIG. 24 that includes processors 2410, memory 2430, and I/O components 2450. In this example, the software architecture 2302 can be conceptualized as a stack of layers where each layer may provide a particular functionality. For example, the software architecture 2302 includes layers such as an operating system 2304, libraries 2306, frameworks 2308, and applications 2310. Operationally, the applications 2310 invoke API calls 2312 through the software stack and receive messages 2314 in response to the API calls 2312, consistent with some embodiments.

In various implementations, the operating system 2304 manages hardware resources and provides common services. The operating system 2304 includes, for example, a kernel 2320, services 2322, and drivers 2324. The kernel 2320 acts as an abstraction layer between the hardware and the other software layers, consistent with some embodiments. For example, the kernel 2320 provides memory management, processor management (e.g., scheduling), component management, networking, and security settings, among other functionality. The services 2322 can provide other common services for the other software layers. The drivers 2324 are responsible for controlling or interfacing with the underlying hardware, according to some embodiments. For instance, the drivers 2324 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 2306 provide a low-level common infrastructure utilized by the applications 2310. The libraries 2306 can include system libraries 2330 (e.g., C standard library) that can provide functions such as memory allocation functions, string manipulation functions, mathematic functions, and the like. In addition, the libraries 2306 can include API libraries 2332 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and in three dimensions (3D) graphic content on a display), database libraries (e.g., SQLite to provide various relational database functions), web libraries (e.g., WebKit to provide web browsing functionality), and the like. The libraries 2306 can also include a wide variety of other libraries 2334 to provide many other APIs to the applications 2310.

The frameworks 2308 provide a high-level common infrastructure that can be utilized by the applications 2310, according to some embodiments. For example, the frameworks 2308 provide various graphic user interface (GUI) functions, high-level resource management, high-level location services, and so forth. The frameworks 2308 can provide a broad spectrum of other APIs that can be utilized by the applications 2310, some of which may be specific to a particular operating system 2304 or platform.

In an example embodiment, the applications 2310 include a home application 2350, a contacts application 2352, a browser application 2354, a book reader application 2356, a location application 2358, a media application 2360, a messaging application 2362, a game application 2364, and a broad assortment of other applications such as a third party application 2366. According to some embodiments, the applications 2310 are programs that execute functions defined in the programs. Various programming languages can be employed to create one or more of the applications 2310, structured in a variety of manners, such as object-oriented programming languages (e.g., Objective-C, Java, or C++) or procedural programming languages (e.g., C or assembly language). In a specific example, the third party application 2366 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third party application 2366 can invoke the API calls 2312 provided by the operating system 2304 to facilitate functionality described herein.

Some embodiments may particularly include an interactive messaging application 2367. In certain embodiments, this may be a standalone application that operates to manage communications with a server system, such as third-party servers or server system 108. In other embodiments, this functionality may be integrated with another application (e.g., messaging application 2362). The interactive messaging application 2367 may request and display various data related to messaging, media content, media collections, media overlays, and so forth, and may provide the capability for a user to input data related to the system via a touch interface, keyboard, or using a camera device of machine 2400, communication with a server system via I/O components 1150, and receipt and storage of object data in memory 1130. Presentation of information and user inputs associated with the information may be managed by the interactive messaging application 2367 using different frameworks 2308, library 2306 elements, or operating system 2304 elements operating on the machine 2400.

Figure 24:
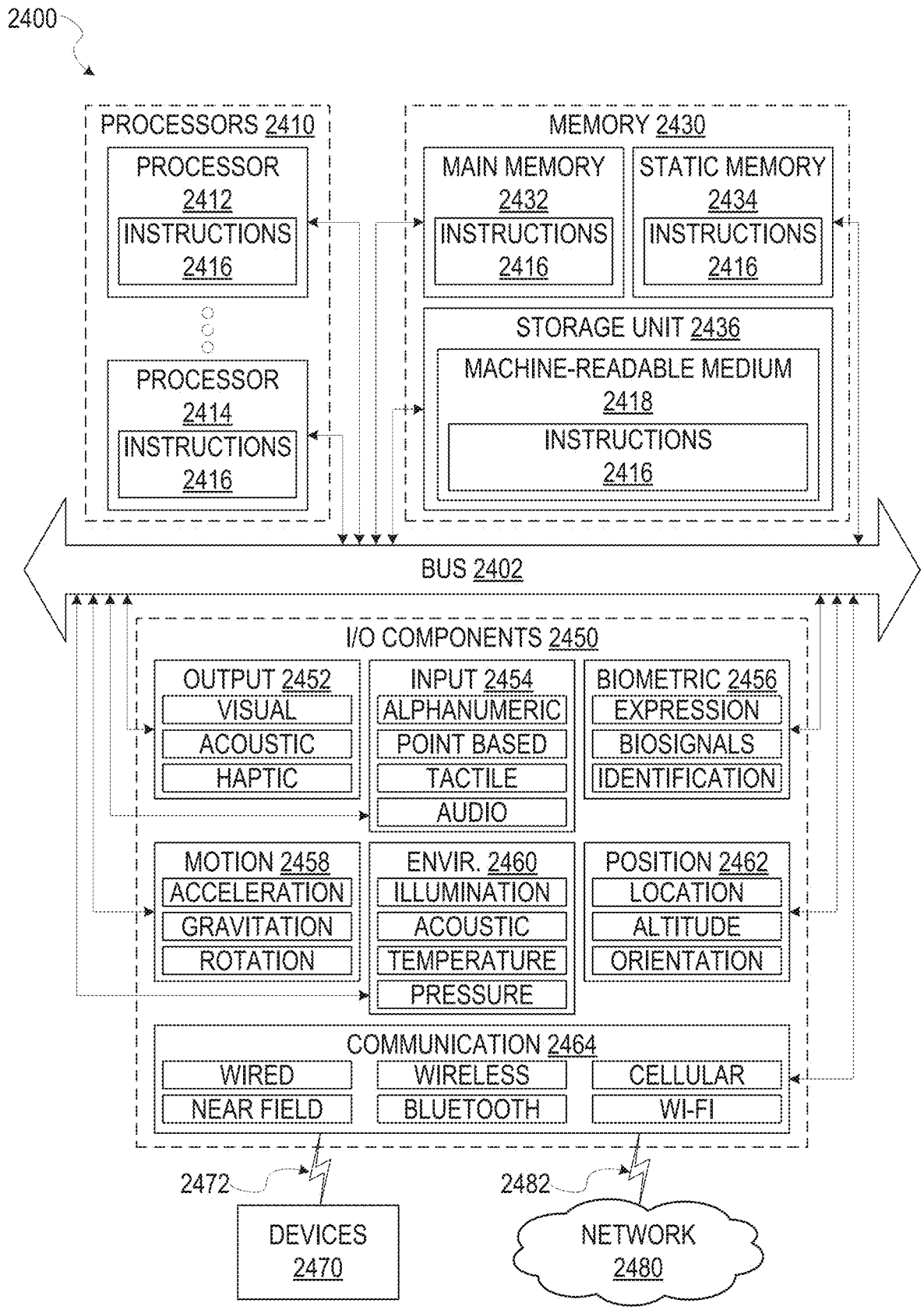
FIG. 24 illustrates a diagrammatic representation of a machine, in the form of a computer system, within which a set of instructions may be executed for causing the machine to perform any one or more of the methodologies discussed herein, according to an example embodiment.

FIG. 24 is a block diagram illustrating components of a machine 2400, according to some embodiments, able to read instructions from a machine-readable medium (e.g., a machine-readable storage medium) and perform any one or more of the methodologies discussed herein. Specifically, FIG. 24 shows a diagrammatic representation of the machine 2400 in the example form of a computer system, within which instructions 2416 (e.g., software, a program, an application, an applet, an app, or other executable code) for causing the machine 2400 to perform any one or more of the methodologies discussed herein can be executed. In alternative embodiments, the machine 2400 operates as a standalone device or can be coupled (e.g., networked) to other machines. In a networked deployment, the machine 2400 may operate in the capacity of a server machine 102, 112, 116, 118, 122, 124, and the like, or a client device 110 in a server-client network environment, or as a peer machine in a peer-to-peer (or distributed) network environment. The machine 2400 can comprise, but not be limited to, a server computer, a client computer, a personal computer (PC), a tablet computer, a laptop computer, a netbook, a personal digital assistant (PDA), an entertainment media system a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 2416, sequentially or otherwise, that specify actions to be taken by the machine 2400. Further, while only a single machine 2400 is illustrated, the term "machine" shall also be taken to include a collection of machines 2400 that individually or jointly execute the instructions 2416 to perform any one or more of the methodologies discussed herein.

In various embodiments, the machine 2400 comprises processors 2410, memory 2430, and I/O components 2450, which can be configured to communicate with each other via a bus 2402. In an example embodiment, the processors 2410 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 2412 and a processor 2414 that may execute the instructions 2416. The term "processor" is intended to include multi-core processors 2410 that may comprise two or more independent processors 2412, 2414 (also referred to as "cores") that can execute instructions 2416 contemporaneously. Although FIG. 24 shows multiple processors 2410, the machine 2400 may include a single processor 2410 with a single core, a single processor 2410 with multiple cores (e.g., a multi-core processor 2410), multiple processors 2412, 2414 with a single core, multiple processors 2412, 2414 with multiple cores, or any combination thereof.

The memory 2430 comprises a main memory 2432, a static memory 2434, and a storage unit 2436 accessible to the processors 2410 via the bus 2402, according to some embodiments. The storage unit 2436 can include a machine-readable medium 2418 on which are stored the instructions 2416 embodying any one or more of the methodologies or functions described herein. The instructions 2416 can also reside, completely or at least partially, within the main memory 2432, within the static memory 2434, within at least one of the processors 2410 (e.g., within the processor's cache memory), or any suitable combination thereof, during execution thereof by the machine 2400. Accordingly, in various embodiments, the main memory 2432, the static memory 2434, and the processors 2410 are considered machine-readable media 2418.

As used herein, the term "memory" refers to a machine-readable medium 2418 able to store data temporarily or permanently and may be taken to include, but not be limited to, random-access memory (RAM), read-only memory (ROM), buffer memory, flash memory, and cache memory. While the machine-readable medium 2418 is shown, in an example embodiment, to be a single medium, the term "machine-readable medium" should be taken to include a single medium or multiple media (e.g., a centralized or distributed database, or associated caches and servers) able to store the instructions 2416. The term "machine-readable medium" shall also be taken to include any medium, or combination of multiple media, that is capable of storing instructions (e.g., instructions 2416) for execution by a machine (e.g., machine 2400), such that the instructions 2416, when executed by one or more processors of the machine 2400 (e.g., processors 2410), cause the machine 2400 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 2450 include a wide variety of components to receive input, provide output, produce output, transmit information, exchange information, capture measurements, and so on. In general, it will be appreciated that the I/O components 2450 can include many other components that are not shown in FIG. 24. The I/O components 2450 are grouped according to functionality merely for simplifying the following discussion, and the grouping is in no way limiting. In various example embodiments, the I/O components 2450 include output components 2452 and input components 2454. The output components 2452 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 2454 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 2450 include biometric components 2456, motion components 2458, environmental components 2460, or position components 2462, among a wide array of other components. For example, the biometric components 2456 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 2458 include acceleration sensor components (e.g., accelerometer), gravitation sensor components, rotation sensor components (e.g., gyroscope), and so forth. The environmental components 2460 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 2462 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 2450 may include communication components 2464 operable to couple the machine 2400 to a network 2480 or devices 2470 via a coupling 2482 and a coupling 2472, respectively. For example, the communication components 2464 include a network interface component or another suitable device to interface with the network 2480. In further examples, communication components 2464 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 2470 may be another machine 2400 or any of a wide variety of peripheral devices (e.g., a peripheral device coupled via a Universal Serial Bus (USB)).

Moreover, in some embodiments, the communication components 2464 detect identifiers or include components operable to detect identifiers. For example, the communication components 2464 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 2464, such as location via Internet Protocol (IP) geolocation, location via WI-FI® signal triangulation, location via detecting a BLU- ETOOTH® or NFC beacon signal that may indicate a particular location, and so forth.

In various example embodiments, one or more portions of the network 2480 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 2480 or a portion of the network 2480 may include a wireless or cellular network, and the coupling 2482 may be a Code Division Multiple Access (CDMA) connection, a Global System for Mobile communications (GSM) connection, or another type of cellular or wireless coupling. In this example, the coupling 2482 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 2416 are transmitted or received over the network 2480 using a transmission medium via a network interface device (e.g., a network interface component included in the communication components 2464) and utilizing any one of a number of well-known transfer protocols (e.g., Hypertext Transfer Protocol (HTTP)). Similarly, in other example embodiments, the instructions 2416 are transmitted or received using a transmission medium via the coupling 2472 (e.g., a peer-to-peer coupling) to the devices 2470. The term "transmission medium" shall be taken to include any intangible medium that is capable of storing, encoding, or carrying the instructions 2416 for execution by the machine 2400, and includes digital or analog communications signals or other intangible media to facilitate communication of such software.

Furthermore, the machine-readable medium 2418 is non-transitory (in other words, not having any transitory signals) in that it does not embody a propagating signal. However, labeling the machine-readable medium 2418 "non-transitory" should not be construed to mean that the medium is incapable of movement: the medium 2418 should be considered as being transportable from one physical location to another. Additionally, since the machine-readable medium 2418 is tangible, the machine-readable medium 2418 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
    receiving, by a computing device, a first media content item associated with a first interactive object of an interactive message;
    receiving, by a computing device, a second media content item associated with a second interactive object of the interactive message;
    generating, by the computing device, a third media content item based on the first media content item and second media content item, wherein the third media content item comprises combined features of the first media content item and the second media content item; and
    causing, by the computing device, display of the generated third media content item.

2. The method of claim 1, wherein the first media content item comprises an image of a first user and the second media content item comprises an image of a second user.

3. The method of claim 1, wherein generating the third media content item based on the first media content item and the second media content item comprises:
    generating a first feature vector for the first image;
    generating a second feature vector for the second image;
    combining the first feature vector and the second feature vector to generate a combined feature vector; and
    rendering the third image from the combined feature vector.

4. The method of claim 3, wherein combining the first feature vector and the second feature vector to generate the combined feature vector comprises averaging features represented in the first feature vector and the second feature vector to generate the combined feature vector comprising the averaged features.

5. The method of claim 4, wherein a first weight is associate with the first feature vector and a second weight is associated with the second feature vector, and wherein the features represented in the first feature vector and the second feature vector are weighted according to the first weight and second weight to generate the averaged features of the combined feature vector.

6. The method of claim 3, wherein the first feature vector is generating by:
generating a mesh of the first media content item, the mesh comprising a three-dimensional model of the first media content item;
generating a vector representing a feature type for the one or more features indicated in the mesh;
generating a texture of the first media content item, the texture indicating color values in the mesh of the first media content item;
generating a vector representing the texture of the first media content item; and
combining the vector representing a feature type for the one or more features indicated in the mesh and the vector representing the texture of the first media content item to generate the first feature vector.

7. The method of claim 6, wherein the feature type indicates a shape of the feature.

8. The method of claim 3, wherein rendering the third image from the combined feature vector comprises applying the combined feature vector to a target template mesh and rendering the target template mesh to generate the third image.

9. The method of claim 1, wherein the computing device is part of a server system and causing display of the generated third media content item comprises providing the third media content item to a second computing device for display on the second computing device.

10. The method of claim 1, wherein the computing device is a first computing device and wherein the first media content item is received from a second computing device and the second media content item is received from a camera device of the first computing device.

11. A computing device comprising:
a memory that stores instructions; and
one or more processors configured by the instructions to perform operations comprising:
receiving a first media content item associated with a first interactive object of an interactive message;
receiving a second media content item associated with a second interactive object of the interactive message;
generating a third media content item based on the first media content item and second media content item, wherein the third media content item comprises combined features of the first media content item and the second media content item; and
causing display of the generated third media content item.

12. The computing device of claim 11, wherein the first media content item comprises an image of a first user and the second media content item comprises an image of a second user.

13. The computing device of claim 11, wherein generating the third media content item based on the first media content item and the second media content item comprises:
generating a first feature vector for the first image;
generating a second feature vector for the second image;
combining the first feature vector and the second feature vector to generate a combined feature vector; and
rendering the third image from the combined feature vector.

14. The computing device of claim 13, wherein combining the first feature vector and the second feature vector to generate the combined feature vector comprises averaging features represented in the first feature vector and the second feature vector to generate the combined feature vector comprising the averaged features.

15. The computing device of claim 14, wherein a first weight is associate with the first feature vector and a second weight is associated with the second feature vector, and wherein the features represented in the first feature vector and the second feature vector are weighted according to the first weight and second weight to generate the averaged features of the combined feature vector.

16. The computing device of claim 13, wherein the first feature vector is generating by:
generating a mesh of the first media content item, the mesh comprising a three-dimensional model of the first media content item;
generating a vector representing a feature type for the one or more features indicated in the mesh;
generating a texture of the first media content item, the texture indicating color values in the mesh of the first media content item;
generating a vector representing the texture of the first media content item; and
combining the vector representing a feature type for the one or more features indicated in the mesh and the vector representing the texture of the first media content item to generate the first feature vector.

17. The computing device of claim 16, wherein the feature type indicates a shape of the feature.

18. The computing device of claim 13, wherein rendering the third image from the combined feature vector comprises applying the combined feature vector to a target template mesh and rendering the target template mesh to generate the third image.

19. The computing device of claim 11, wherein the computing device is part of a server system and causing display of the generated third media content item comprises providing the third media content item to a second computing device for display on the second computing device.

20. A non-transitory computer-readable medium comprising instructions stored thereon that are executable by at least one processor to cause a computing device to perform operations comprising:
receiving a first media content item associated with a first interactive object of an interactive message;
receiving a second media content item associated with a second interactive object of the interactive message;
generating a third media content item based on the first media content item and second media content item, wherein the third media content item comprises combined features of the first media content item and the second media content item; and
causing display of the generated third media content item.

* * * * *